US012686029B2

(12) United States Patent
Springhorn et al.

(10) Patent No.: US 12,686,029 B2
(45) Date of Patent: Jul. 21, 2026

(54) MANUAL VISCOUS LIQUID DISPENSING DEVICE HAVING A LOCKING MECHANISM

(71) Applicant: NORDSON CORPORATION, Westlake, OH (US)

(72) Inventors: Robert W. Springhorn, Cream Ridge, NJ (US); Robert C. Brennan, Robbinsville, NJ (US)

(73) Assignee: Nordson Corporation, Westlake, OH (US)

( * ) Notice: Subject to any disclaimer, the term of this patent is extended or adjusted under 35 U.S.C. 154(b) by 189 days.

(21) Appl. No.: 18/832,148

(22) PCT Filed: Jan. 24, 2023

(86) PCT No.: PCT/US2023/061124
§ 371 (c)(1),
(2) Date: Jul. 23, 2024

(87) PCT Pub. No.: WO2023/147287
PCT Pub. Date: Aug. 3, 2023

(65) Prior Publication Data
US 2025/0153214 A1 May 15, 2025

Related U.S. Application Data

(60) Provisional application No. 63/303,676, filed on Jan. 27, 2022.

(51) Int. Cl.
*B05C 17/01* (2006.01)
*B05C 17/005* (2006.01)

(52) U.S. Cl.
CPC .... *B05C 17/0126* (2013.01); *B05C 17/00596* (2013.01)

(58) Field of Classification Search
CPC .......... B05C 17/0126; B05C 17/00596; B05C 17/0123; B05C 17/013
See application file for complete search history.

(56) References Cited

U.S. PATENT DOCUMENTS 2,845,805 A * 8/1958 Crewe .................. G01F 11/026 222/391
3,884,396 A * 5/1975 Gordon ............ B05C 17/00516 222/391

(Continued)

FOREIGN PATENT DOCUMENTS

DE 3151662 A1 7/1983
WO 2016061039 A1 4/2016

*Primary Examiner* — Paul R Durand
*Assistant Examiner* — Randall A Gruby
(74) *Attorney, Agent, or Firm* — BakerHostetler

(57) ABSTRACT

A product dispensing device includes a body having a first end and a second end; a product holding mechanism at the first end; a plunger defining a rack, supported by and extending through the product holding mechanism and the body from the first end to the second end; a drive mechanism, pivotally coupled to the body, including a trigger, a trigger return spring, and a pawl connected to the trigger via a pawl bias spring for bringing the pawl into contact with the plunger, the pawl having pawl teeth shaped to complement the rack; and a locking mechanism configured to limit a movement of the plunger in a rearwards direction while the locking mechanism is in a locked configuration.

20 Claims, 30 Drawing Sheets

(56) References Cited

U.S. PATENT DOCUMENTS 4,126,251 A * 11/1978 Subwick ............. B05C 17/0123 222/326
4,323,176 A * 4/1982 Sartain ................. B65D 83/763 222/326
4,356,938 A * 11/1982 Kayser ................ B05C 17/0123 222/391
4,390,115 A * 6/1983 Bigham .............. B05C 17/0143 222/326
4,425,121 A * 1/1984 Young ...................... A61D 7/00 604/209
4,432,473 A * 2/1984 MacEwen .......... B65D 83/7713 222/327
4,452,285 A * 6/1984 Leibhard ........... B05C 17/00553 222/391
4,472,141 A * 9/1984 Dragan ............. B05C 17/00506 222/386
4,526,303 A * 7/1985 Harrod ............... A61B 17/8825 222/391
4,632,669 A * 12/1986 Phipps, Sr. ..... A61M 25/10182 604/920
5,464,131 A * 11/1995 Keller ................. B05C 17/0123 222/391
5,501,374 A * 3/1996 Laufer ................ B05C 17/0123 222/391
5,638,997 A * 6/1997 Hawkins ............ A61B 17/8822 604/209
5,755,362 A * 5/1998 Rodriguez, Jr. ......... A61C 5/64 222/391
5,875,920 A * 3/1999 Parent ..................... B05C 17/01 222/391
5,893,488 A * 4/1999 Hoag ...................... B05C 17/01 604/209
5,955,114 A * 9/1999 Llanos .................. G01F 11/026 222/391
6,260,737 B1 7/2001 Gruendeman
6,286,718 B1 * 9/2001 Durrant ............. B05C 17/00596 222/80
6,325,249 B1 * 12/2001 Keller ............... B05C 17/00553 222/326
6,386,401 B1 * 5/2002 Dodd ...................... B05C 17/01 222/391
6,439,439 B1 * 8/2002 Rickard .................. B05C 17/01 222/391
6,672,489 B1 * 1/2004 Huang .................. G01F 11/026 222/391
8,365,953 B2 * 2/2013 Calvo ................. B05C 17/0126 222/391
8,603,025 B2 * 12/2013 Pongratz ............. B05C 17/0123 604/141
8,672,193 B2 * 3/2014 Vukic ................. B05C 17/0123 222/326

* cited by examiner

MANUAL VISCOUS LIQUID DISPENSING DEVICE HAVING A LOCKING MECHANISM

CROSS-REFERENCE TO RELATED APPLICATIONS

This application is a National Stage Application of International Patent App. No. PCT/US2023/061124, filed Jan. 24, 2023, which claims the benefit of U.S. Provisional Patent App. No. 63/303,676, filed Jan. 27, 2022, the entire disclosures of both of which are hereby incorporated by reference as if set forth in their entirety herein.

FIELD OF THE DISCLOSURE

The disclosure relates to a manual viscous liquid dispensing device. More particularly, the disclosure relates to a manual viscous liquid dispensing device having a locking mechanism. More particularly, the disclosure relates to a manual viscous liquid dispensing device having a mechanical locking mechanism.

BACKGROUND OF THE DISCLOSURE

Tools, containers, and/or devices for dispensing viscous liquid or semi-liquid products or materials are common and widespread, and find use in many applications including medical applications, commercial applications, end consumer applications, and/or industrial applications. Such product dispensing tools or containers ideally allow the product to be applied in an accurate, mess-free, and waste-free manner. For example, the viscous liquids may include medical products, glues, sealants, greases and/or the like.

Such product dispensing tools are typically designed to be used in conjunction with sealed cartridges containing the product to be dispensed. For example, medical products, sealing caulk products, adhesive products, lubricant, products, and/or the like. The cartridges are typically tubes having a sealed dispensing outlet (a conical tip for example) disposed on one end, with the other end being open for receiving a plunger mechanism or the like from the dispenser. Just inside an open end of the cartridge is a slidably-sealed, axially-movable piston, disc, and/or the like. For use, the cartridge is placed in a retaining section, a dispensing section, and/or the like of the dispensing device, and the plunger is brought into contact with the piston. When a user desires to dispense product, the dispensing outlet of the cartridge is unsealed (typically the closed tip of the dispensing outlet is cut off), and the plunger is forced against the piston through whatever actuation mechanism is employed by the dispenser. This forces the piston axially down the tube and against the product, which in turn is dispensed through the dispensing outlet. The dispensing tools can also be used with commercially available syringes, where the product to be dispensed is drawn into the syringe with the syringe plunger which is sealingly engaged with the internal diameter of the syringe. The syringe can then be retained by the cartridge holding mechanism either directly or with an adapter so that the plunger of the dispensing device presses on the plunger of the syringe to dispense product.

With reference to FIG. 26, current implementations of a product dispensing tool 1 utilize a ratchet and pawl mechanism 2 to drive forward a plunger 3 of the product dispensing tool 1. The current implementation utilizes a friction component 4 to restrict a backward ratchet motion and can be overcome by a drag force of a returning driving pawl of the ratchet and pawl mechanism 2. However, the effectiveness of the friction component 4 is diminished in applications that require the product dispensing tool 1 to go through elevated temperature processes such as sterilization and/or the like while the plunger 3 is engaged with the friction component 4 for long periods of time. In this regard, when the plunger 3 is engaged with the friction component 4 under stress, when subjected to heat and time, in the stressed position, the gripping members of the friction component 4 relax. This results in the gripping members failing to restrict the backward ratchet motion of the plunger 3. In other words, the gripping members and other components of the product dispensing tool 1 are prone to environmental degradation, especially in a stressed position.

Accordingly, a manual viscous liquid dispensing device configured to be resistant to environmental degradation is needed.

SUMMARY OF THE DISCLOSURE

The foregoing needs are met, to a great extent, by the disclosure, wherein in one aspect a manual viscous liquid dispensing device having a locking mechanism is provided.

One aspect includes a product dispensing device that includes: a body having a first end and a second end; a product holding mechanism at the first end; a plunger defining a rack, supported by and extending through the product holding mechanism and the body from the first end to the second end; a drive mechanism, pivotally coupled to the body, including a trigger, a trigger return spring, and a pawl connected to the trigger via a pawl bias spring for bringing the pawl into contact with the plunger, the pawl having pawl teeth shaped to complement the rack; and a locking mechanism configured to limit a movement of the plunger in a rearwards direction while the locking mechanism is in a locked configuration, where when a user actuates the trigger, the pawl teeth are configured move the plunger forward toward the first end of the body.

One aspect includes a product dispensing device that includes: a body having a first end and a second end; a product holding mechanism at the first end; a plunger defining a rack, supported by and extending through the product holding mechanism and the body from the first end to the second end; a drive mechanism, pivotally coupled to the body, including a trigger, a trigger return spring, and a pawl connected to the trigger via a pawl bias spring for bringing the pawl into contact with the plunger, the pawl having pawl teeth shaped to complement the rack; and a locking mechanism configured to limit a movement of the plunger in a rearwards direction while the locking mechanism is in a locked configuration, where when a user actuates the trigger, the pawl teeth are configured move the plunger forward toward the first end of the body, and when the user releases the trigger, the pawl teeth are configured to slide back over the rack allowing the user to further advance the plunger upon subsequent actuation of the trigger.

One aspect includes a product dispensing device that includes: a body having a first end and a second end; a product holding mechanism at the first end; a plunger defining a rack, supported by and extending through the product holding mechanism and the body from the first end to the second end; a drive mechanism, pivotally coupled to the body, including a trigger, a trigger return spring, and a pawl connected to the trigger via a pawl bias spring for bringing the pawl into contact with the plunger, the pawl having pawl teeth shaped to complement the rack; and a locking mechanism configured to limit a movement of the plunger in a rearwards direction while the locking mechanism is in a locked configuration, where when a user actuates the trigger, the pawl teeth are configured move the plunger forward toward the first end of the body; and where the locking mechanism is configured to mechanically lock to a component of the product dispensing device.

In one aspect, the disclosure is directed to a hand dispenser that adds a locking mechanism to limit the backward motion of the plunger as the driving pawl is retracted. The locking mechanism is less sensitive to heating processes and/or prolonged engagement of the locking mechanism because in its engaged state it is under less stress compared to the friction grip.

In one aspect, the disclosure is directed to a hand dispenser that adds a mechanical locking mechanism to limit the backward motion of the plunger as the driving pawl is retracted. The mechanical locking mechanism is less sensitive to heating processes and/or prolonged engagement of the mechanical locking mechanism because in its engaged state it is under less stress compared to the friction grip.

In one aspect, the disclosure is directed to a hand dispenser that adds a locking pawl to limit the backward motion of the plunger as the driving pawl is retracted. The locking pawl efficacy is less sensitive to heating processes and/or prolonged engagement of the locking mechanism because in its engaged state it is under less stress compared to the friction grip.

In one aspect, the disclosure is directed to a hand dispenser that adds a fin locking pawl to limit the backward motion of the plunger as the driving pawl is retracted. The fin locking pawl efficacy is less sensitive to heating processes and/or prolonged engagement of the locking mechanism because in its engaged state it is under less stress compared to the engagement between the friction grip and plunger.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
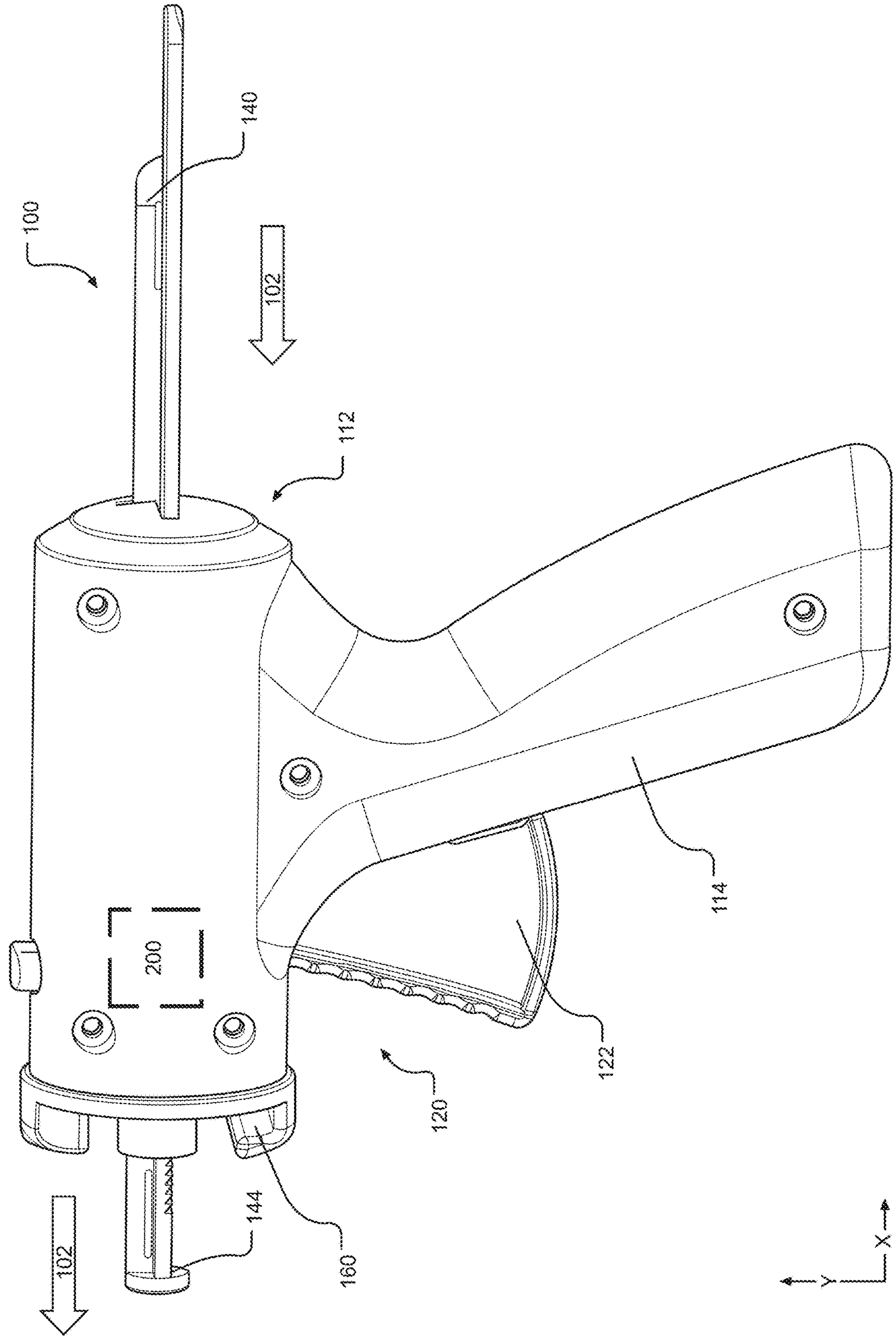
FIG. 1 illustrates a side view of an external configuration of a dispenser device according to aspects of the disclosure.

The disclosure will now be described with reference to the drawing figures, in which like reference numerals refer to like parts throughout. Aspects of the disclosure advantageously provide a manual viscous liquid dispensing device having a locking mechanism.

Turning now to Figures, a detailed description concerning various aspects of a dispensing device 100 will now be provided.

FIG. 1 illustrates a side view of an external configuration of a dispenser device according to aspects of the disclosure.

Figure 2A:
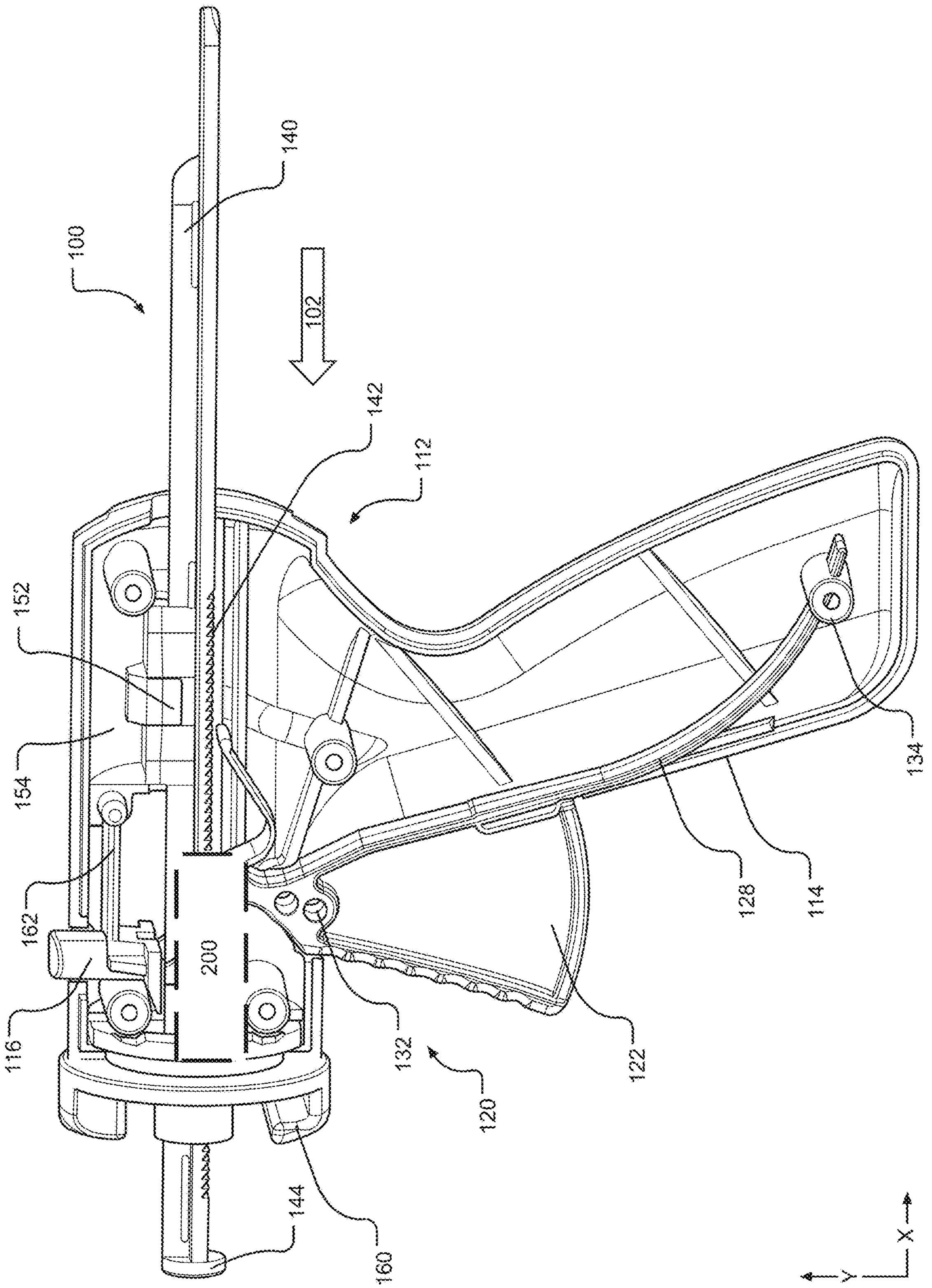
FIG. 2A illustrates a cross-sectional side view of the dispenser according to an aspect of FIG. 1.

FIG. 2A illustrates a cross-sectional side view of the dispenser according to an aspect of FIG. 1.

Figure 2B:
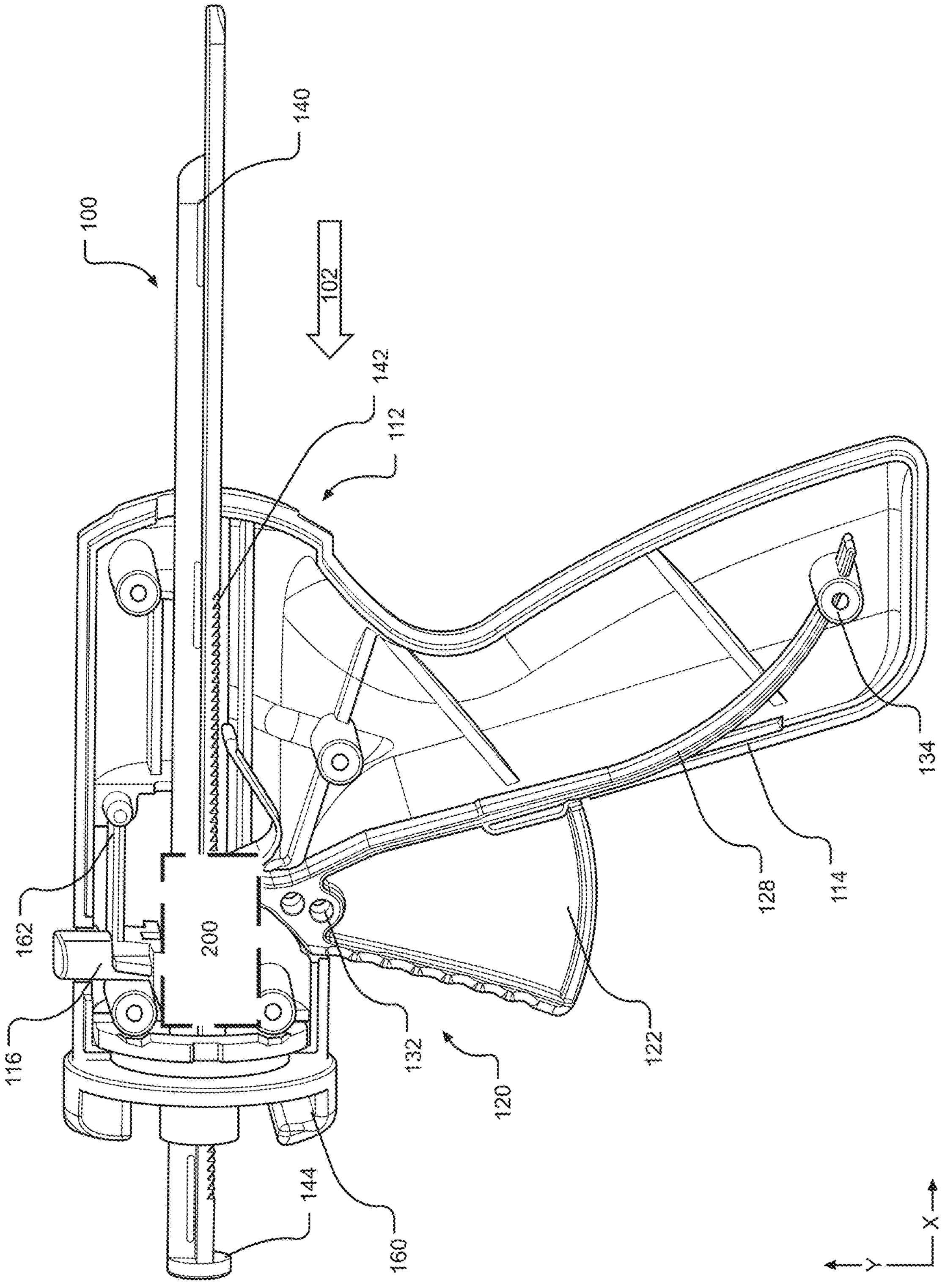
FIG. 2B illustrates a cross-sectional side view of the dispenser according to an aspect of FIG. 1.

FIG. 2B illustrates a cross-sectional side view of the dispenser according to an aspect of FIG. 1.

As illustrated in FIG. 1, the dispensing device 100 may include a dispenser body 112, which may have cylindrical hollow configuration, a handle extension 114, a product cartridge holding mechanism 160, and a trigger 122. The dispensing device 100 may further include a plunger 140 that may be supported by and may extend axially through the dispenser body 112. The plunger 140 may include a plunger head 144 that may be integral with the plunger 140. Additionally, the plunger head 144 may be disposed on the end of the dispensing device 100 proximate the product cartridge holding mechanism 160. Furthermore, the dispensing device 100 may have a drive component 120 operative in response to the trigger 122.

In particular, the dispensing device 100 may be configured such that operation of the trigger 122 in conjunction with the drive component 120 operates to move the plunger 140 in a direction 102 that also moves the plunger head 144 in the direction 102. Accordingly, the plunger head 144 operates on a product cartridge held by the product cartridge holding mechanism 160 to dispense a product as desired.

Additionally, the dispensing device 100 may include a locking mechanism 200. The locking mechanism 200 may be configured to limit a movement of the plunger 140 and/or the plunger head 144 in only the direction 102 while the locking mechanism 200 is in the locked configuration. In other words, the locking mechanism 200 may be configured to prevent a movement of the plunger 140 and/or the plunger head 144 in a direction opposite the direction 102 while in the locked configuration. In particular, the locking mechanism 200 may be configured to engage one or more of the components of the dispensing device 100 to prevent the movement of the plunger 140 and/or the plunger head 144 in a direction opposite the direction 102 while in the locked configuration. In aspects, the locking mechanism 200 may be configured as one or more mechanical components to mechanically engage one or more of the components of the dispensing device 100 to mechanically lock and/or prevent the movement of the plunger 140 and/or the plunger head 144 in a direction opposite the direction 102 while in the locked configuration.

In this regard, some rearwards motion of the plunger 140 opposite to a direction 102 is desirable to prevent the cartridge from remaining under pressure and drooling. However, too much of this rearward motion will result in unacceptable dispensation of the product resulting in reduced dispensing efficiency or no dispensing at all. In order to limit rearwards movement, the locking mechanism 200 may be utilized by the dispensing device 100 to limit rearward motion (opposite the direction 102) of the plunger 140 and/or the plunger head 144 while in the locked configuration.

Moreover, the locking mechanism 200 may be configured to be resistant to environmental degradation. For example, the locking mechanism 200 may be configured to be robust and able to withstand elevated temperature processes such as sterilization processes and/or the like, such as ethylene oxide sterilization processes. Additionally, the locking mechanism 200 may be configured with various features to be resistant to environmental degradation. For example, the locking mechanism 200 may be configured with various features to be robust and able to withstand elevated temperature processes such as sterilization processes and/or the like, such as ethylene oxide sterilization processes.

With reference to FIG. 2A, the drive component 120 may include and/or be responsive to the trigger 122, a pawl, a pawl release feature, a trigger return spring 128, and a pawl bias spring. The drive component 120 may be pivotally connected to the dispenser body 112 via a trigger pin 132. If the trigger pin 132 is integral with the dispenser body 112, then the drive component 120 may be provided with a complementary shaped hole for engaging the trigger pin 132. The trigger return spring 128 may be biased in place via a spring stop 134 that may be integral with the handle extension 114. The plunger 140 may have an underside provided with a rack 142 having a plurality of rachet teeth. Moreover, the plunger 140 may be supported by and extend axially through the dispenser body 112, with the plunger head 144, integral with the plunger 140, disposed on the end of the dispenser proximate the product cartridge holding mechanism 160.

Additionally, the dispensing device 100 may include a pawl release feature that may include an external pawl release button 116 that may extend through the dispenser body 112 and may be located at the top of the dispenser body 112. The external pawl release button 116 may be held in place via a button bias spring 162. The external pawl release button 116 may extend down through the dispensing device 100 on one or both sides of the plunger 140.

The external pawl release button 116 may be configured to disengage the pawl, place the locking mechanism 200 in an unlocked configuration, and/or the like. When the external pawl release button 116 is actuated by a user in order to disengage the pawl, the force of the button bias spring 162 may be overcome, and the external pawl release button 116 may come into contact with a pawl extension. This pushes the pawl down, against the force exerted by the button bias spring 162, thereby spacing the pawl teeth from the rack and allowing the user to freely move the plunger 140. In aspects, the external pawl release button 116 is actuated by a user and the locking mechanism 200 may be placed in an unlocked configuration allowing the user to freely move the plunger 140.

As mentioned, some rearwards motion of the plunger 140 is desirable to prevent the cartridge from remaining under pressure and drooling. However, too much of this rearward motion will result in unacceptable dispensation resulting in reduced dispensing efficiency or no dispensing at all. In order to further limit rearwards movement of the plunger 140 and/or the plunger head 144, a floating gripper 152 may be placed onto the plunger 140 to limit a rearward motion (a direction opposite the direction 102) of the plunger 140 and/or the plunger head 144.

The floating gripper 152 may be a friction device dimensioned to slidably engage a top guide of the plunger 140. The gripper 152 may be located within a pocket 154 inside the dispenser body 112. The pocket 154 may be defined by a rear pocket wall and a forward pocket wall and may be slightly longer than the gripper 152. When the trigger 122 is depressed and the plunger 140 moves forward, the gripper 152, in friction contact with the plunger 140, may move along with the plunger 140 until the gripper 152 hits the forward pocket wall of the pocket 154. At this point the force exerted by the user upon the trigger 122 is sufficient to overcome the friction force of the gripper 152, and the plunger 140 slides through the gripper 152. In aspects, the gripper 152 may be a frictional component that limits rearward movement of the plunger 140 and/or the plunger head 144; and the locking mechanism 200 may be one or more mechanical components that limit rearward movement of the plunger 140 and/or the plunger head 144.

With reference to FIG. 2B, the dispensing device 100 may be configured without the gripper 152. In this regard, the locking mechanism 200 may be configured to provide a sufficient limit on rearward movement of the plunger 140. In particular, the locking mechanism 200 may be one or more mechanical components that limit rearward movement of the plunger 140 and/or the plunger head 144.

Figure 3:
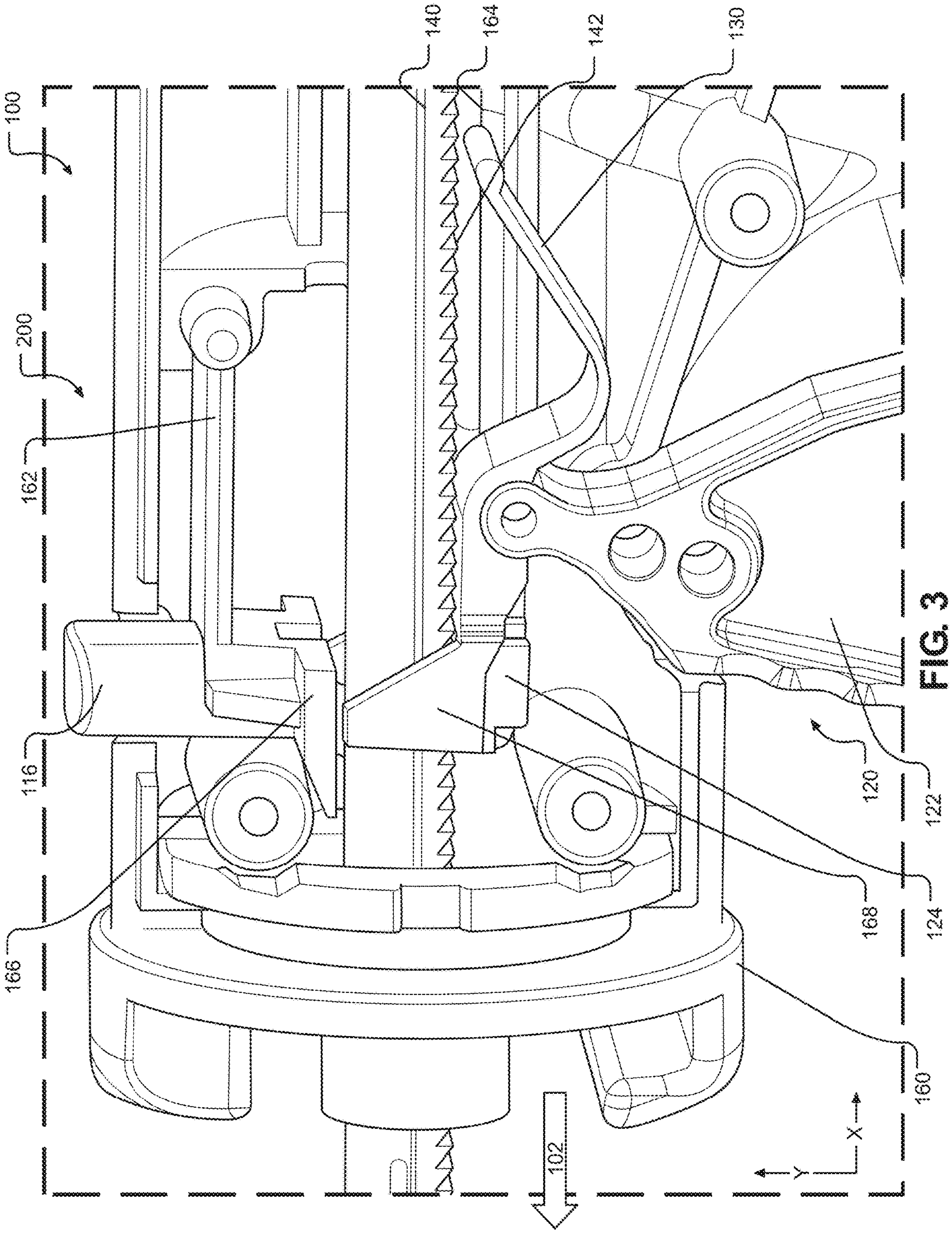
FIG. 3 illustrates a cross-sectional side view of the dispenser according to an aspect of FIG. 1.

FIG. 3 illustrates a cross-sectional side view of the dispenser according to an aspect of FIG. 1.

Figure 4A:
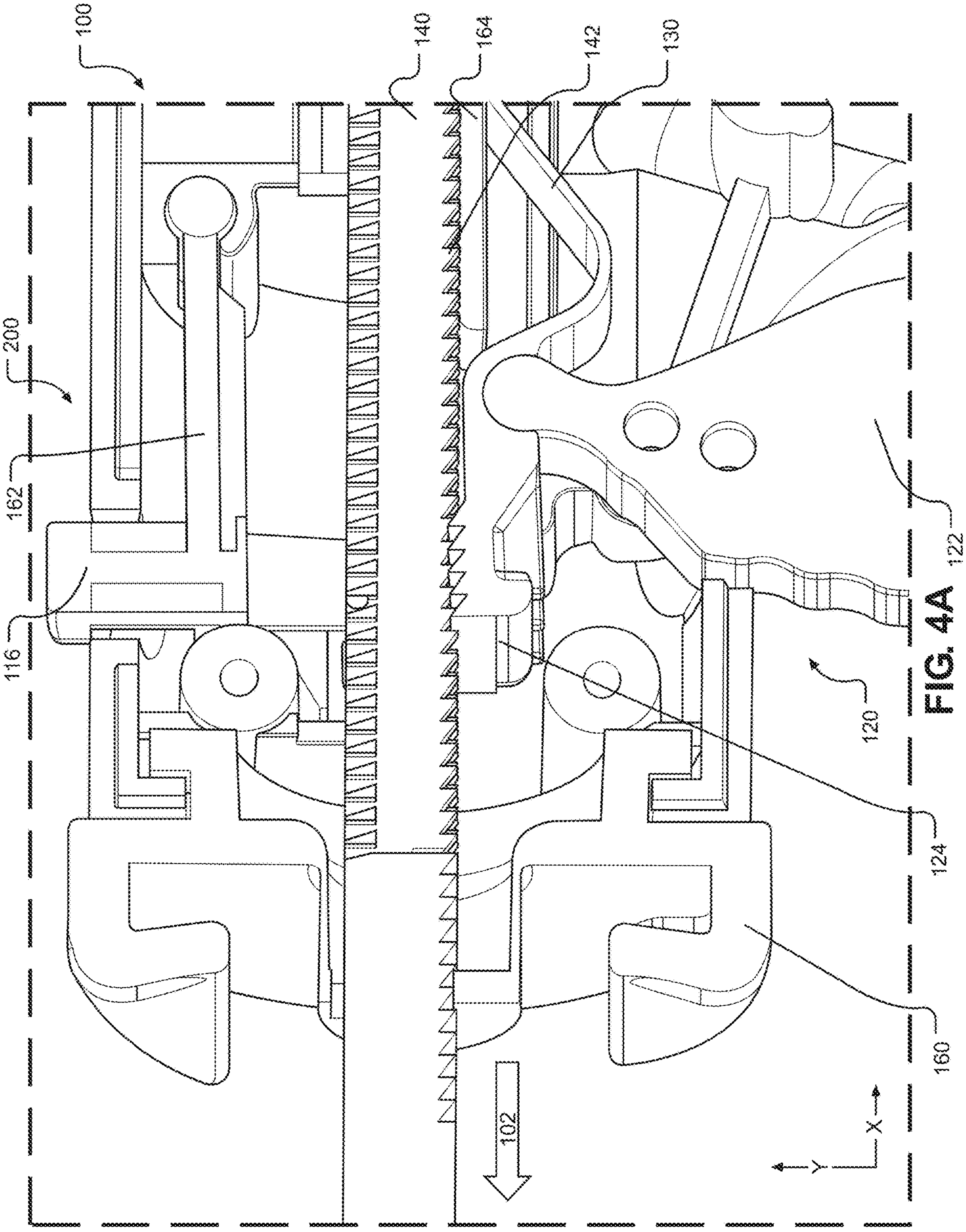
FIG. 4A illustrates a cross-sectional side view of an aspect of a dispenser device according to FIG. 3.

FIG. 4A illustrates a cross-sectional side view of an aspect of a dispenser device according to FIG. 3.

Figure 4B:
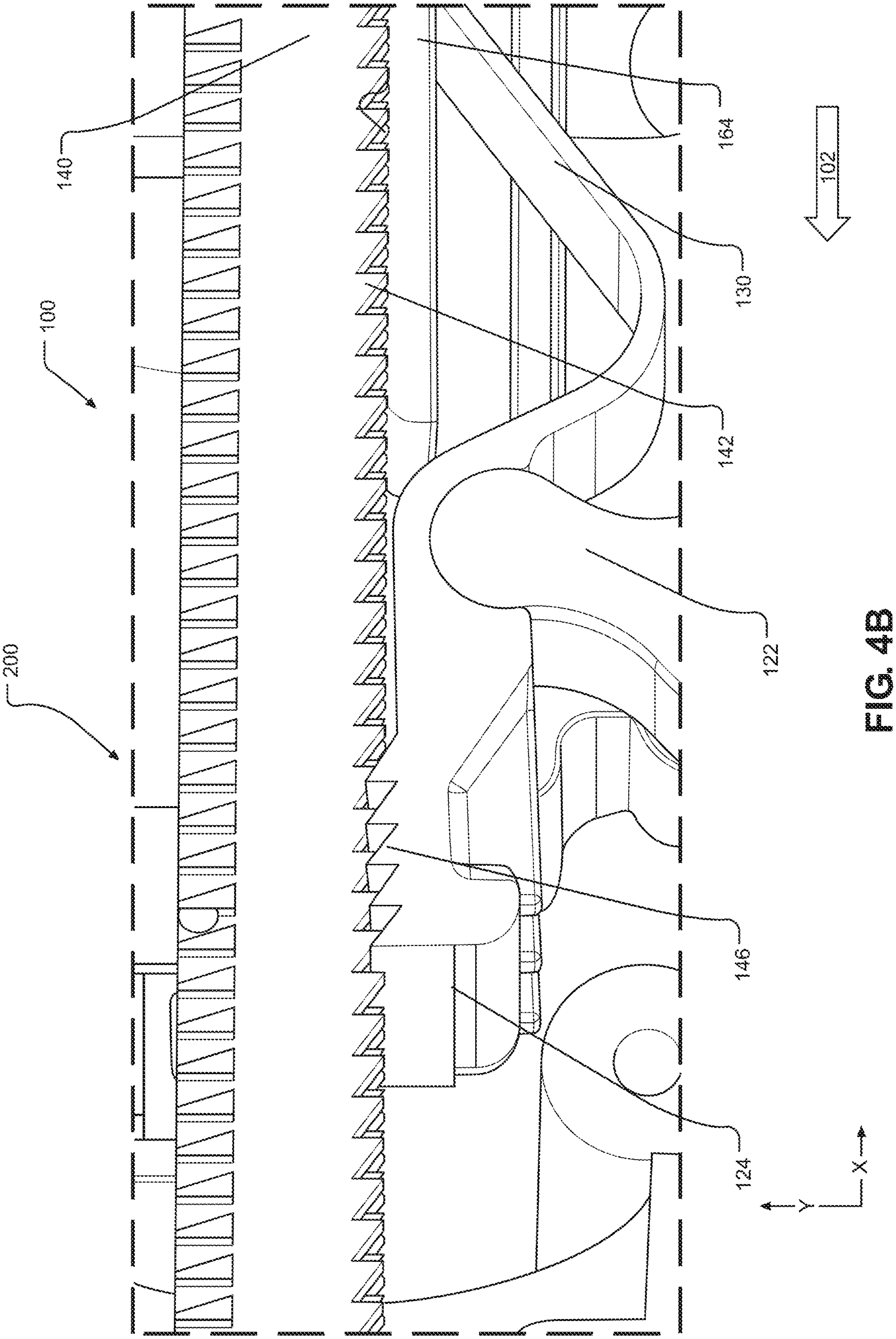
FIG. 4B illustrates a more detailed cross-sectional side view of an aspect of a dispenser device according to FIG. 3.

FIG. 4B illustrates a more detailed cross-sectional side view of an aspect of a dispenser device according to FIG. 3.

Figure 5A:
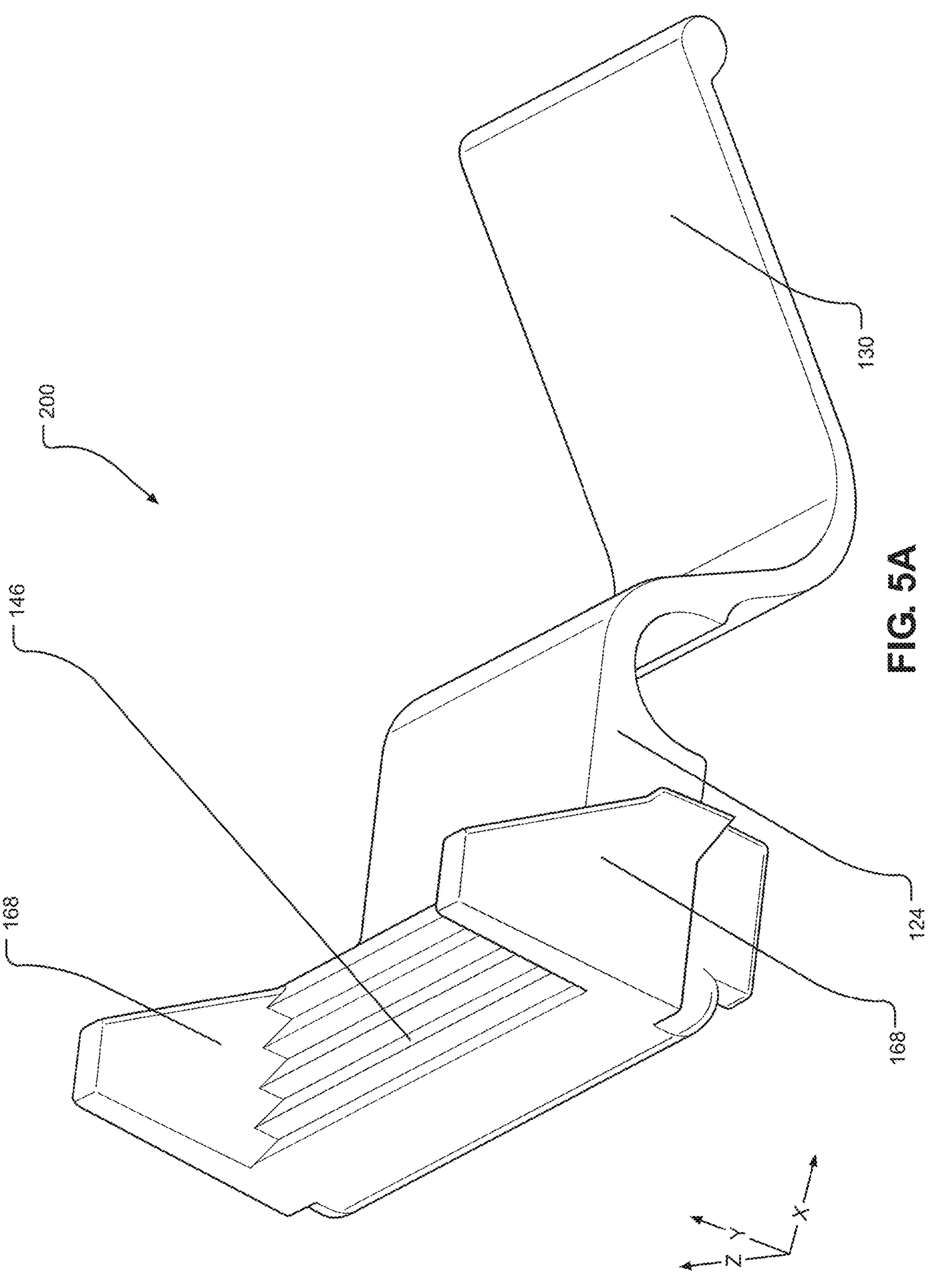
FIG. 5A illustrates a perspective view of an exemplary implementation of a pawl according to the disclosure.

FIG. 5A illustrates a perspective view of an exemplary implementation of a pawl according to the disclosure.

Figure 5B:
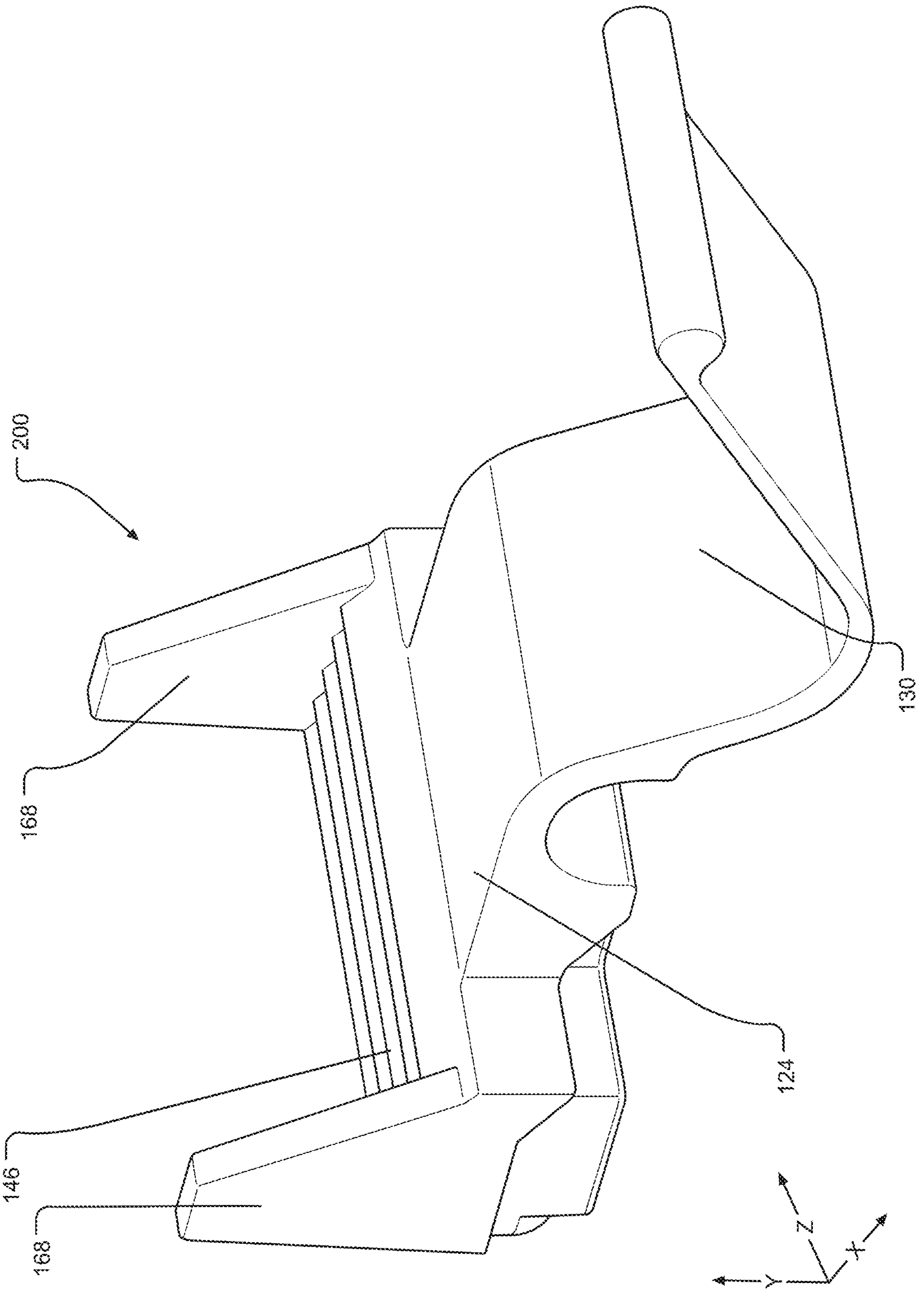
FIG. 5B illustrates a perspective view of the exemplary implementation of a pawl according to FIG. 5A.

FIG. 5B illustrates a perspective view of the exemplary implementation of a pawl according to FIG. 5A.

In particular, FIG. 3 illustrates a cross-sectional view of the dispensing device 100 and FIG. 4A and FIG. 4B illustrate a cross-sectional view of the dispensing device 100 with a portion of a pawl 124 hidden in order to more clearly illustrate aspects of the pawl 124. More specifically, as illustrated in FIG. 4A, the drive component 120 may incorporate functions of the trigger 122, the pawl 124, a pawl bias spring 130, and/or the like. The pawl bias spring 130 may bias the pawl 124 against the underside of the plunger 140, and may cause a plurality of pawl teeth 146 arranged on the pawl 124 to engage the rack 142 upon actuation the trigger 122. In other words, actuation of the trigger 122 forces the pawl 124 to engage the plurality of pawl teeth 146 arranged on the pawl 124 to engage the rack 142 and move the plunger 140 and/or the plunger head 144 in the direction 102.

In aspects, the pawl 124 may be separate from the trigger 122. In this aspect, the pawl 124 may be pivotally coupled to the trigger 122. The pawl 124 may be maintained in place by the pawl bias spring 130 in contact with a spring guide 164. In this instance, the pawl bias spring 130 may be a thin, resilient, flexible extension of the pawl 124, and may bias the pawl 124 against the rack 142 even when the trigger 122 is unactuated. During product dispensation, the pawl bias spring 130 moves with the pawl 124 and is guided and supported by the spring guide 164, for movement with the pawl 124, at an end remote from the pawl 124.

Releasing the pawl 124 from the rack 142 is accomplished by exerting force downwards on the external pawl release button 116. In aspects, as illustrated in FIG. 3, the external pawl release button 116 may include a surface 166; and the pawl 124 may include a pawl extension 168. In this regard, releasing the pawl 124 from the rack 142 is accomplished by exerting force downwards on the external pawl release button 116 that forces the surface 166 of the external pawl release button 116 to engage the pawl extension 168 of the pawl 124 as illustrated in FIG. 3.

In operation, before a product cartridge is attached to the dispenser via the product cartridge holding mechanism 160, the plunger 140 must be retracted in the direction opposite to the direction 102. With the pawl 124 disengaged from the plunger 140 by using a pawl release feature that includes the external pawl release button 116 and associated structure, the plunger 140 is manually pulled back until the plunger head 144 is proximate the product cartridge holding mechanism 160. Then, the product cartridge (not shown) is attached. Upon actuation of the trigger 122, the pawl 124 is moved into engagement with the rack 142 and the plunger 140 is advanced. When the plunger head 144 contacts a fluid piston within the cartridge or a syringe plunger, the fluid is pressurized inside the cartridge and expelled out a product outlet provided in the cartridge (in the form of a nozzle, for example.) At the completion of the dispensing stroke, the trigger 122 is released. The pawl 124 slips back over the rack 142 in preparation for engaging new teeth on the rack for the next dispensing cycle. Additionally, the locking mechanism 200 limits the rearward movement, opposite the direction 102 of the plunger 140.

Upon the completion of dispensing, the trigger 122 is released and returns to the rest position by the trigger return spring 128. The force of the pawl teeth 146 in resilient contact with the rack 142 tends to drag the plunger 140 rearward as the pawl teeth 146 slide over the rack 142. This is a result of the complementary, rachet-like shape of the rack 142 and pawl teeth 146. However, the locking mechanism 200 limits the rearward movement, opposite the direction 102 of the plunger 140.

Once the user has just begun to actuate the drive component 120 by depressing the trigger 122, which thereby pivots about the trigger pin 132 counterclockwise. The pawl 124 rotates up and forward, and the pawl teeth 146 begin to engage the rack 142.

After the user has completely depressed the trigger 122. All the pawl teeth 146 have engaged the rack 142, and the plunger 140 has thereby moved forward in the direction 102. Meanwhile, the pawl bias spring 130 has flexed downwards to allow and ensure that the pawl 124 fully engages the rack 142. Without the pawl bias spring 130, the pawl 124 would not be able to fully engage the rack 142, and the dispensing cycle would be much shorter (i.e. the user would have to depress the trigger many times to dispense a suitable amount of product.) Also, the action of depressing the trigger 122 has fully flexed the trigger return spring 128.

Finally, once the user has begun to release the trigger 122, with the drive component 120 pivoting clockwise about the trigger pin 132 under the action of the flexed trigger return spring 128. The pawl teeth 146 slide rearwards and over the rack 142 as described above, and eventually disengage from the rack 142 while the locking mechanism 200 limits the rearward movement of the plunger 140 opposite the direction 102. Upon complete release of the trigger, the drive component 120 and the pawl 124 return back to their position.

Figure 6:
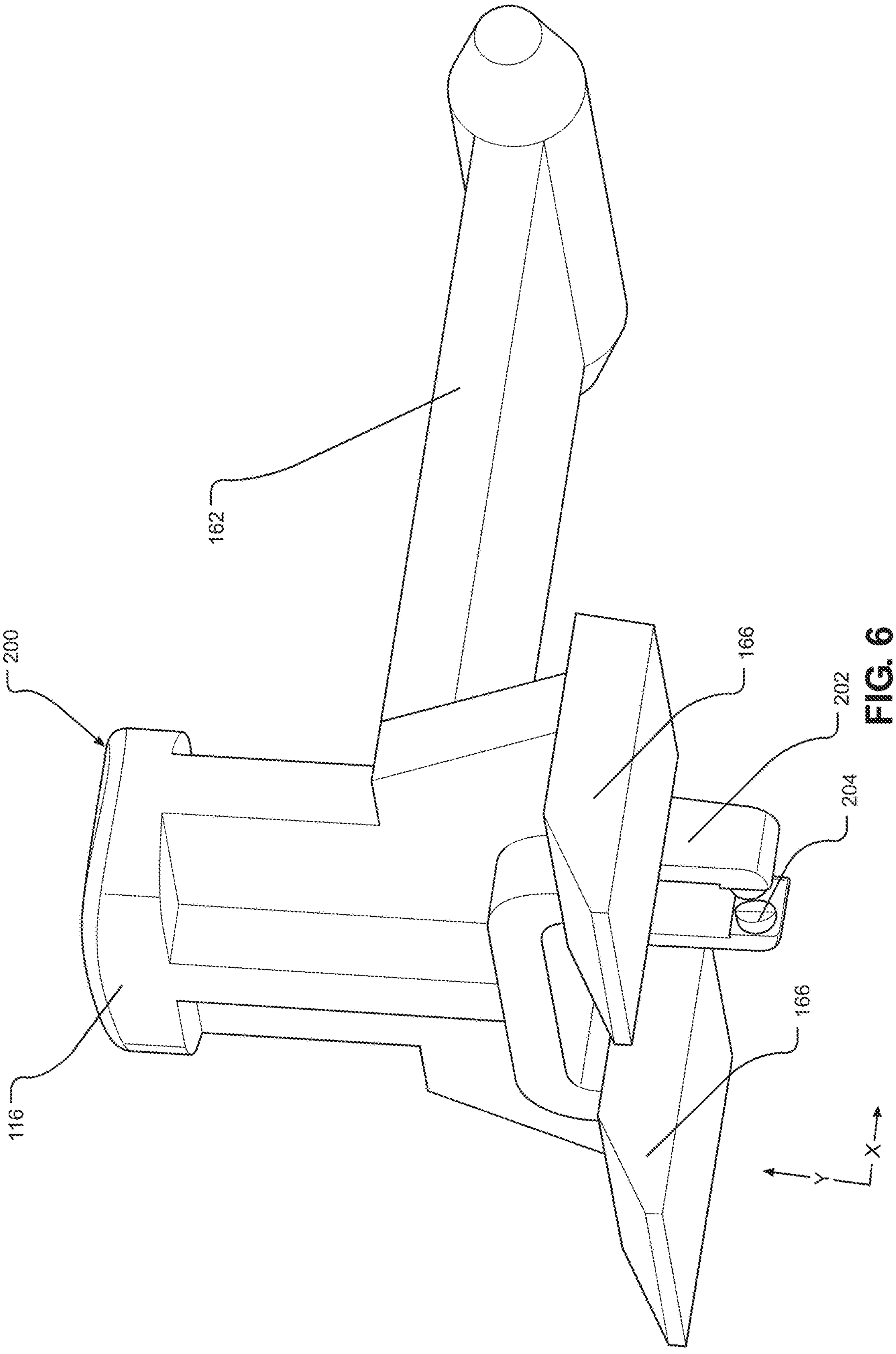
FIG. 6 illustrates a perspective side view of a portion of an exemplary implementation of the locking mechanism according to an aspect of the disclosure.

FIG. 6 illustrates a perspective side view of a portion of an exemplary implementation of the locking mechanism according to an aspect of the disclosure.

Figure 7:
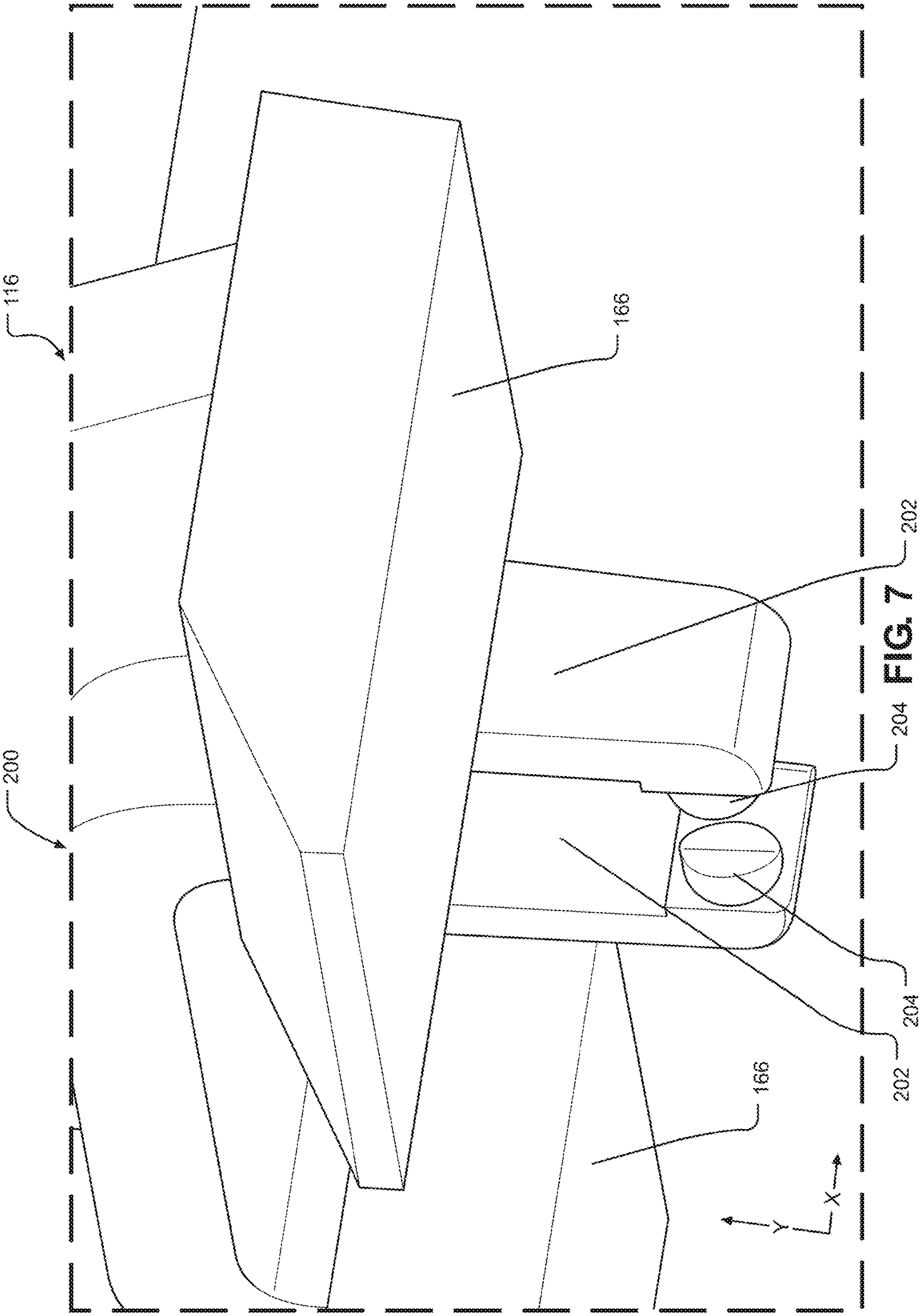
FIG. 7 illustrates a partial perspective side view of a portion of an exemplary implementation of the locking mechanism according to FIG. 6.

FIG. 7 illustrates a partial perspective side view of a portion of an exemplary implementation of the locking mechanism according to FIG. 6.

Figure 8:
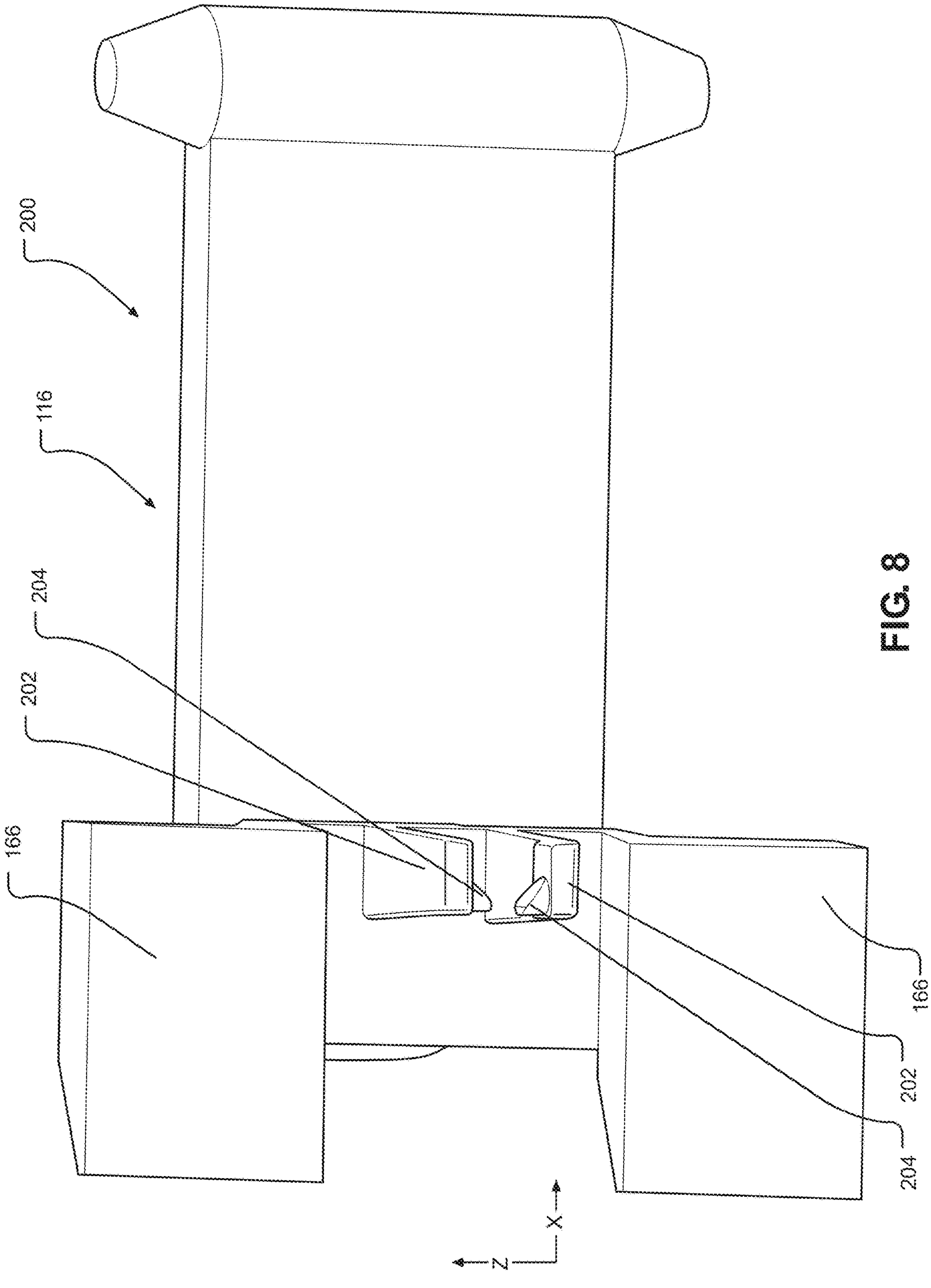
FIG. 8 illustrates a perspective bottom view of a portion of an exemplary implementation of the locking mechanism according to FIG. 6.

FIG. 8 illustrates a perspective bottom view of a portion of an exemplary implementation of the locking mechanism according to FIG. 6.

Figure 9:
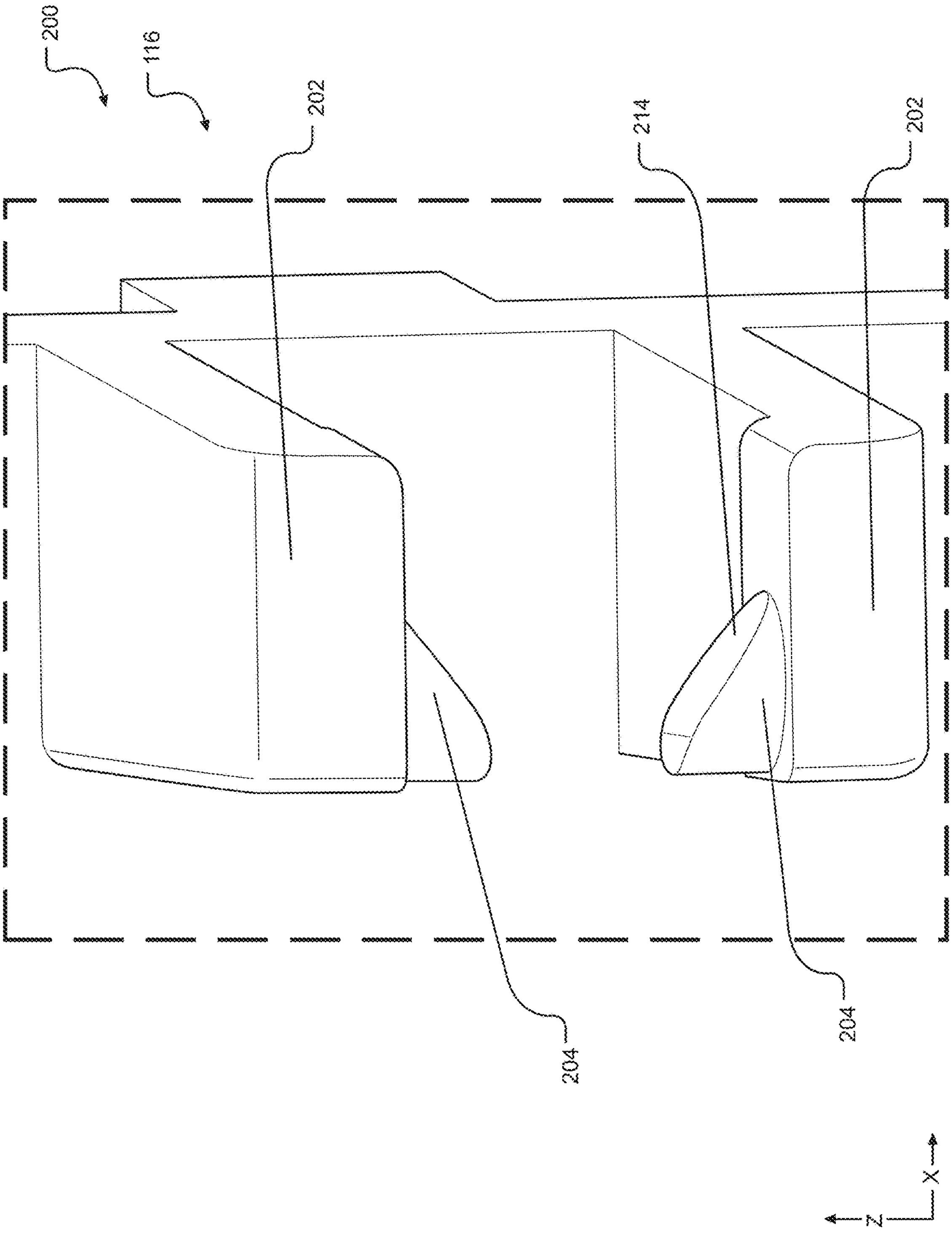
FIG. 9 illustrates a partial perspective bottom view of a portion of an exemplary implementation of the locking mechanism according to FIG. 6.

FIG. 9 illustrates a partial perspective bottom view of a portion of an exemplary implementation of the locking mechanism according to FIG. 6.

Figure 10:
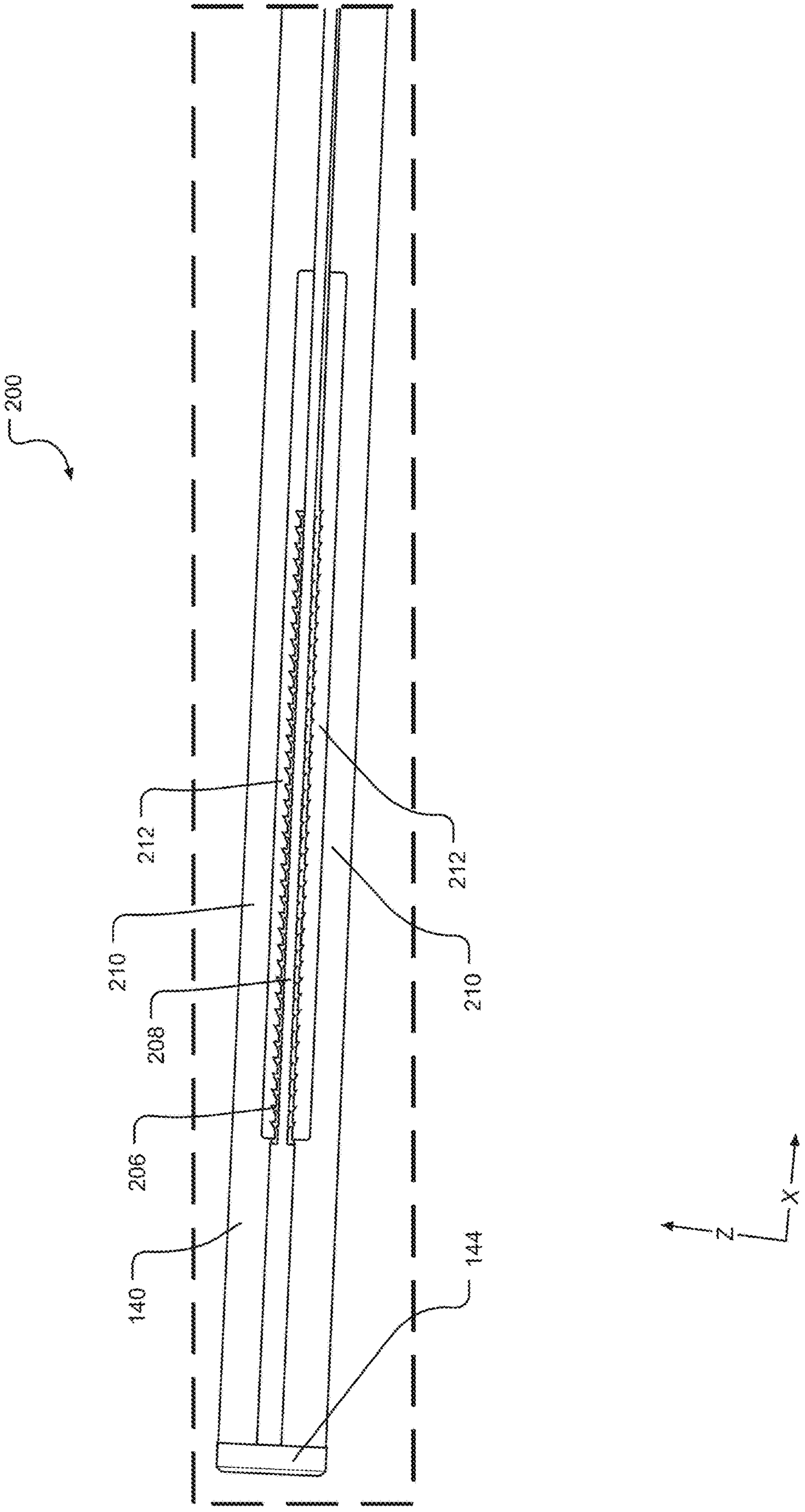
FIG. 10 illustrates a top view of a portion of an exemplary implementation of the locking mechanism according to an aspect of the disclosure.

FIG. 10 illustrates a top view of a portion of an exemplary implementation of the locking mechanism according to an aspect of the disclosure.

Figure 11:
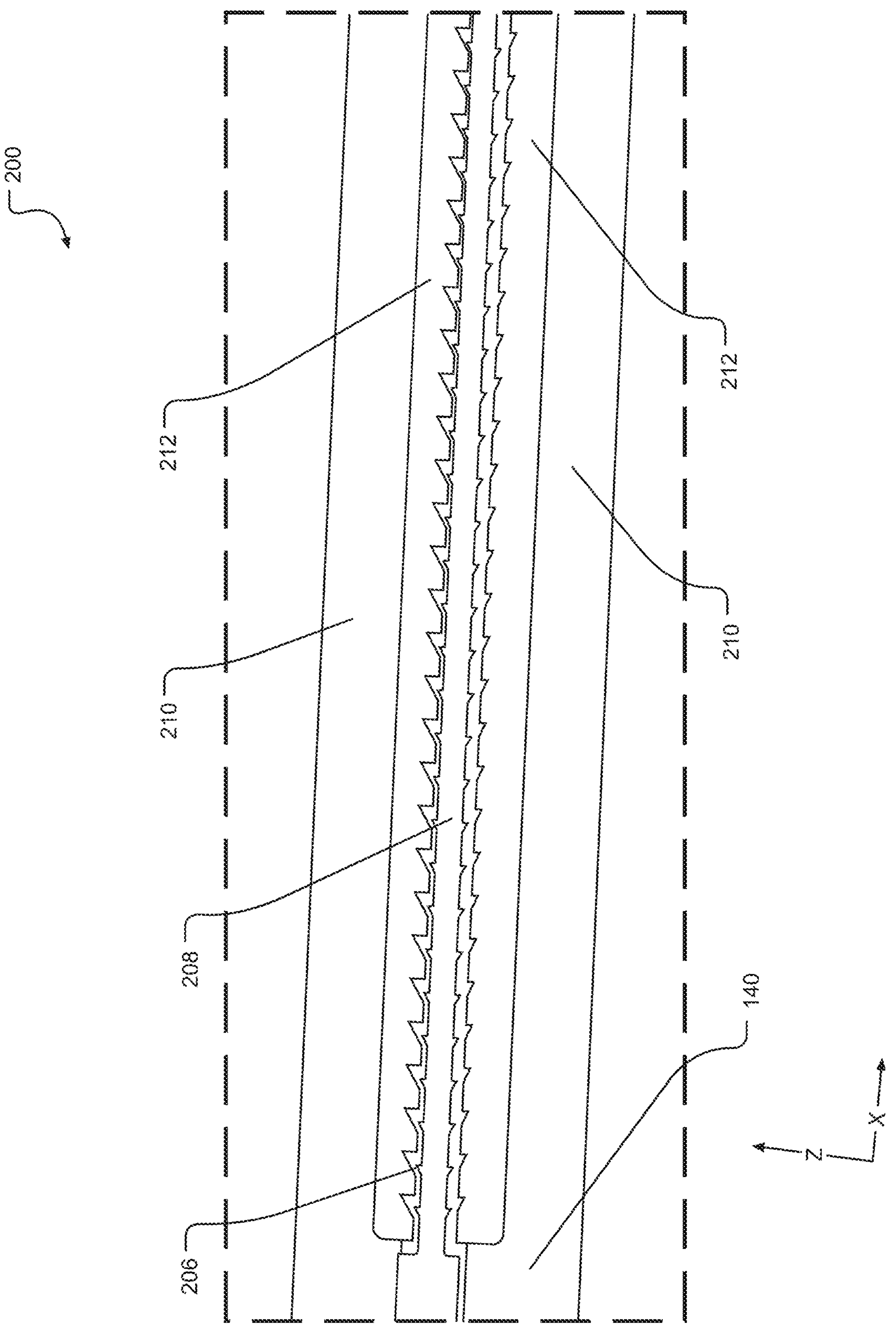
FIG. 11 illustrates a partial top view of a portion of an exemplary implementation of the locking mechanism according to FIG. 10.

FIG. 11 illustrates a partial top view of a portion of an exemplary implementation of the locking mechanism according to FIG. 10.

In particular, FIG. 6, FIG. 7, FIG. 8, and FIG. 9 illustrate a portion of an implementation of the locking mechanism 200 implemented as part of the external pawl release button 116; and FIG. 10 and FIG. 11 illustrate a portion of an implementation of the locking mechanism 200 implemented as part of the plunger 140.

With reference to FIG. 6, FIG. 7, FIG. 8, and FIG. 9, a portion of the locking mechanism 200 may be implemented as part of the external pawl release button 116 and may include arms 202 extending below the external pawl release button 116 along the y-axis. The arms 202 may be configured to surround opposing sides of the plunger 140. In other words, one of the arms 202 may be arranged on one side of the plunger 140; and another one of the arms 202 may be arranged on another side of the plunger 140. Additionally, the arms 202 may include locking teeth 204. The locking teeth 204 may be arranged on an inner surface of each of the arms 202. The locking teeth 204 may be configured to engage with a locking rack 206 arranged on the plunger 140 as illustrated in FIG. 10 and FIG. 11.

With reference to FIG. 9, the locking teeth 204 may have a generally cylindrical cross-section about an axis parallel to the Z axis. However, the locking teeth 204 may include any desired cross-sectional shape. Additionally, the locking teeth 204 may include a ramped shaped surface 214. The ramped shaped surface 214 may have an apex on the left side of FIG. 9 extending inwardly and ramped outwardly along the X axis. The arms 202 may be configured to flex outwardly along the Z axis to allow the locking teeth 204 to disengage from locking rack 206 of the plunger 140.

FIG. 10 and FIG. 11 illustrate an implementation of a portion the locking mechanism 200 implemented as part of the plunger 140. In particular, FIG. 10 and FIG. 11 illustrate the plunger 140 having locking rack 206 arranged on a central rib 208 of the plunger 140. In aspects, the locking rack 206 may be arranged on both sides of the central rib 208. The locking rack 206 of the plunger 140 may be configured to engage and lock with the locking teeth 204 of an exemplary implementation of the external pawl release button 116 when the locking mechanism 200 is in the locked configuration.

Additionally, the plunger 140 may include side ribs 210. Moreover, slots 212 may be formed between the side ribs 210 and the central rib 208. The slots 212 may be configured and structured to allow the arms 202 of the external pawl release button 116 to extend therethrough. More specifically, movement of the external pawl release button 116 downwardly along the y-axis as illustrated in FIG. 6 may move the arms 202 downwardly as well. As the arms 202 moved downwardly they may extend into the slots 212 of the plunger 140.

Figure 12:
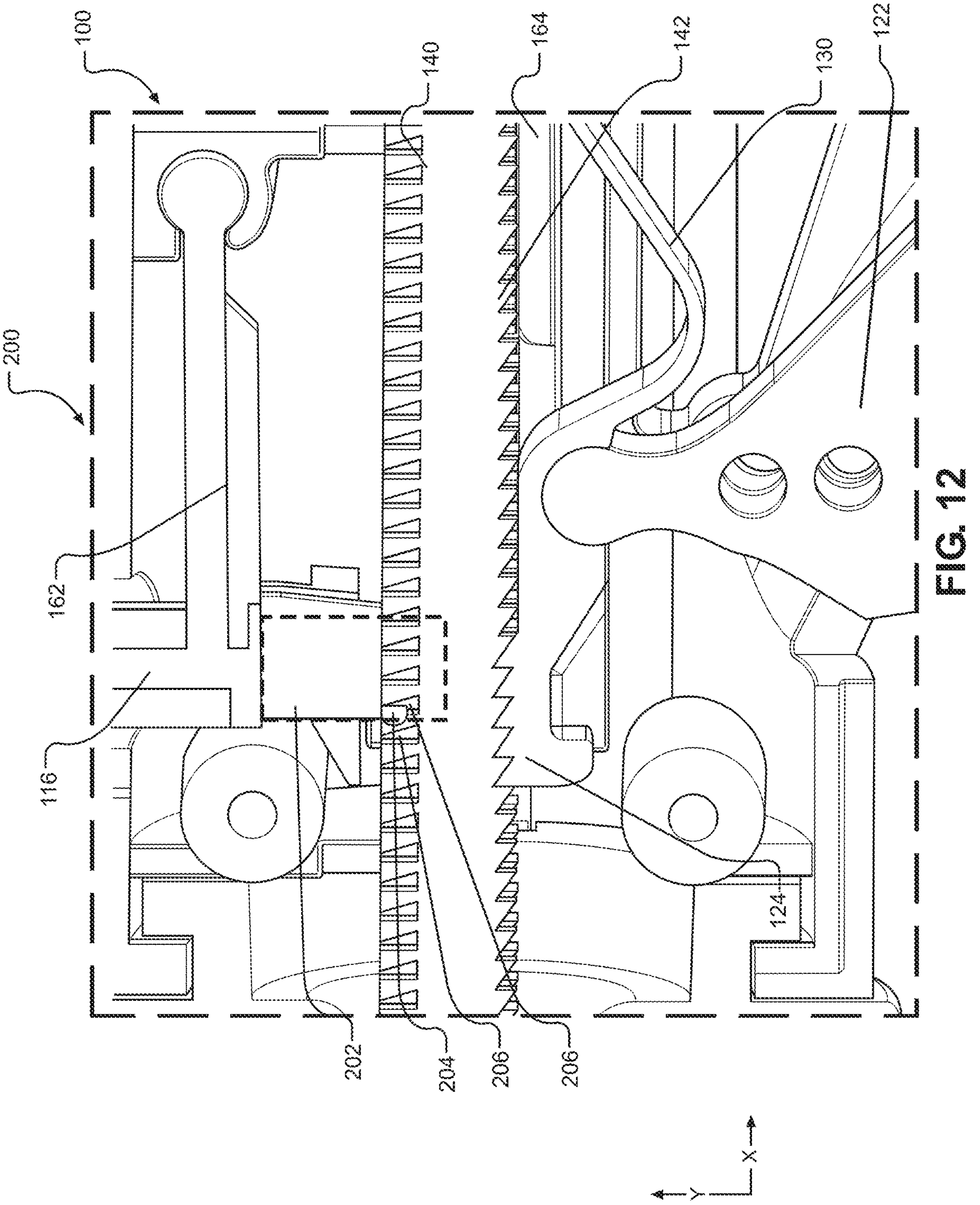
FIG. 12 illustrates a partial cross-sectional side view of an aspect of a dispenser device according to aspects of the disclosure.

FIG. 12 illustrates a partial cross-sectional side view of an aspect of a dispenser device according to aspects of the disclosure.

Figure 13:
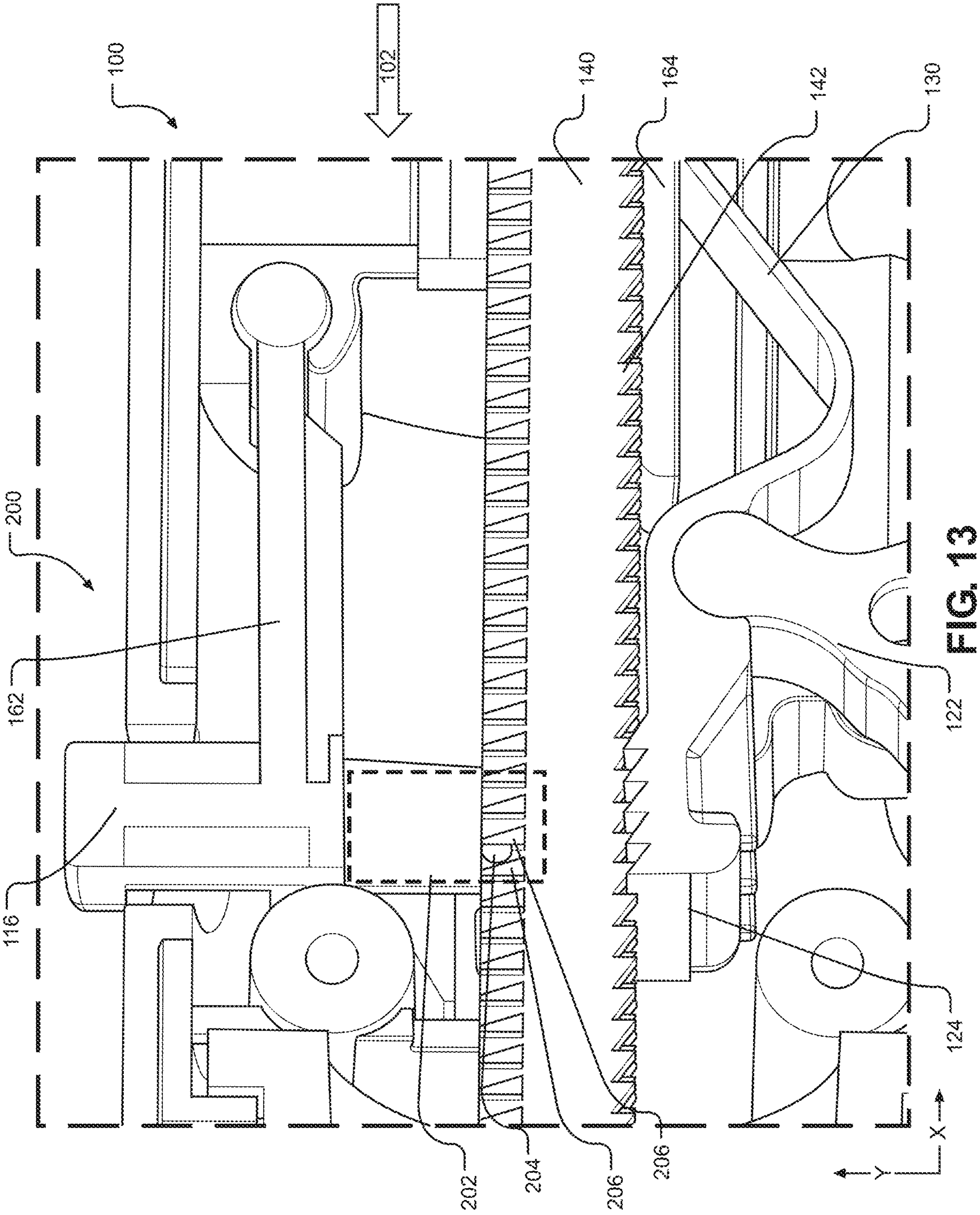
FIG. 13 illustrates a partial cross-sectional side view of an aspect of a dispenser device according to aspects of FIG. 12.

FIG. 13 illustrates a partial cross-sectional side view of an aspect of a dispenser device according to aspects of FIG. 12.

In particular, FIG. 12 illustrates a drive configuration of the dispensing device 100 with a portion of the surface 166, the pawl extension 168, and one of the arms 202 hidden in order to more clearly illustrate operation; and FIG. 13 illustrates a locked configuration of the dispensing device 100 with a portion of the surface 166, the pawl extension 168, and one of the arms 202 hidden in order to more clearly illustrate operation. More specifically, as illustrated in FIG. 12 and FIG. 13, the locking teeth 204 may extend from the arms 202 of the external pawl release button 116 and may be located on either side of the locking rack 206 on the plunger 140. When the dispensing device 100 is operative in the drive configuration as illustrated in FIG. 12, the locking teeth 204 will traverse over the locking rack 206 as the plunger 140 is advanced in the direction 102 in response to operation of the trigger 122. In particular, the ramped shaped surface 214 of the locking teeth 204 will act to flex the arms 202 outwardly along the Z axis at illustrated in FIG. 9 to allow movement of the plunger 140 in the direction 102 by moving over the locking rack 206.

When the dispensing device 100 is operative in the locked configuration as illustrated in FIG. 13, the locking teeth 204 will lock movement of the plunger 140 by engaging one or more teeth of the locking rack 206 preventing and/or limiting movement of the plunger 140 in a direction opposite to the direction 102 even though the pawl 124 is disengaged from the plunger 140 even when the pawl 124 is moving in the rearward direction and dragging the rack 142.

Accordingly, in this aspect the locking mechanism 200 may be configured as one or more mechanical components including at least the external pawl release button 116 and the plunger 140 and associated components to mechanically engage one or more of the components of the dispensing device 100 to mechanically lock and/or prevent the movement of the plunger 140 and/or the plunger head 144 in a direction opposite the direction 102 while in the locked configuration. Additionally, the external pawl release button 116 may be actuated by a user and the locking mechanism 200 may be placed in an unlocked configuration allowing the user to freely move the plunger 140. In particular, the external pawl release button 116 may be actuated by the user to move the arms 202 and the locking teeth 204 vertically downward along the y-axis to disengage the locking teeth 204 from the locking rack 206. In aspects, the arms 202 and the locking teeth 204 may extend into the slots 212 of the plunger 140.

Figure 14:
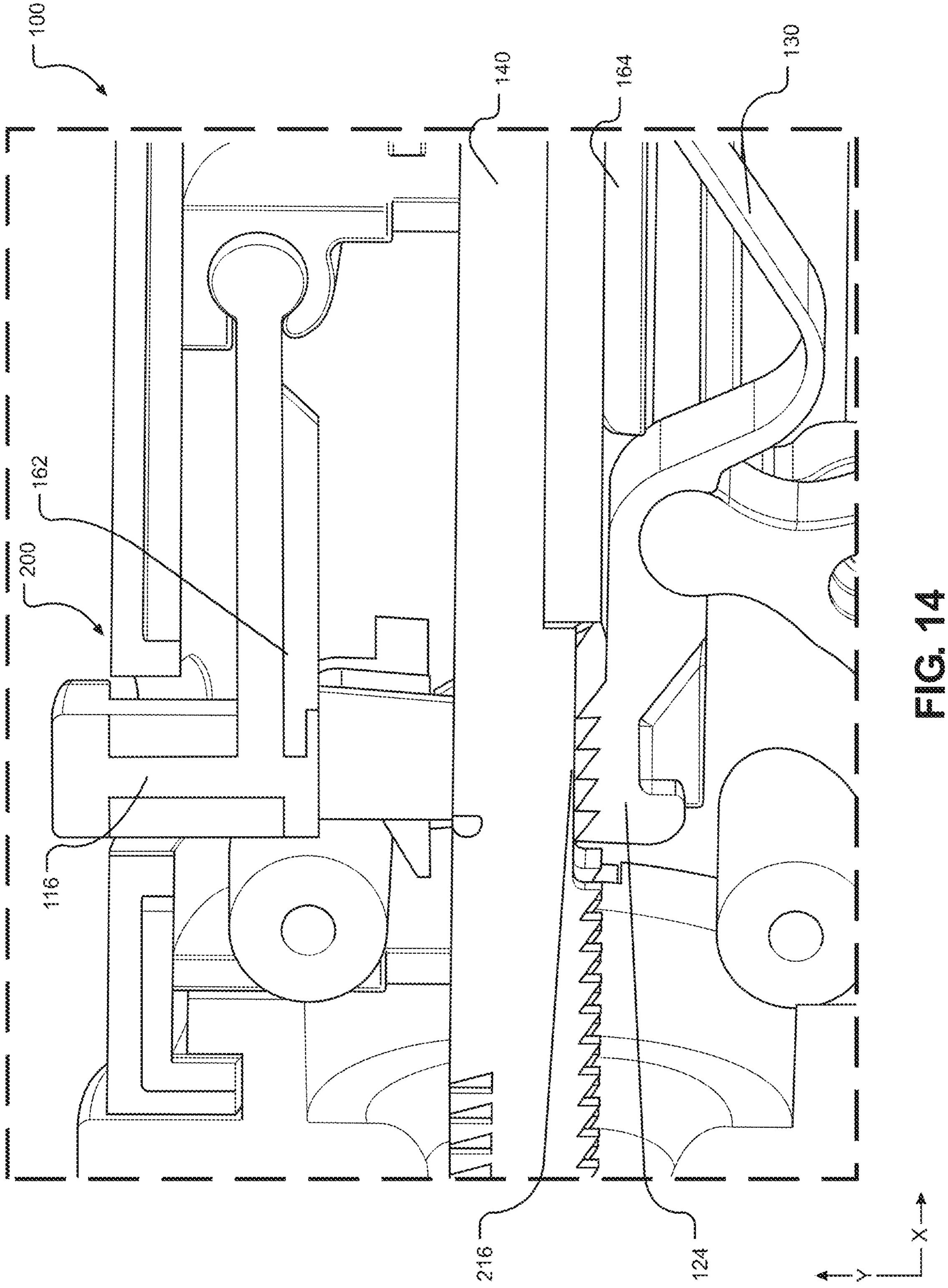
FIG. 14 illustrates a cross-sectional side view of an aspect of a dispenser device according to aspects of the disclosure.

FIG. 14 illustrates a cross-sectional side view of an aspect of a dispenser device according to aspects of the disclosure.

In particular, FIG. 14 illustrates the dispensing device 100 with a portion of the surface 166, the pawl extension 168, and one of the arms 202 hidden in order to more clearly illustrate operation. More specifically, FIG. 14 illustrates that the plunger 140 may further include a relief portion 216. The relief portion 216 may be arranged at an end of the plunger 140 such that when the plunger 140 is fully extended, the pawl 124 may extend into the relief portion 216 preventing inadvertent forces on the pawl 124, the pawl bias spring 130, and/or the like. This may be beneficial for storing the dispensing device 100 as the pawl 124 and/or the pawl bias spring 130 may be under less stress. Additionally, this may be beneficial as the pawl 124 and/or the pawl bias spring 130 may be under less stress and able to withstand elevated temperature processes such as sterilization processes and/or the like, such as ethylene oxide sterilization processes without degradation. In other words, the pawl 124 and/or the pawl bias spring 130 being under less stress may prevent relaxing of the mechanical attributes thereof while in an elevated temperature.

Figure 15A:
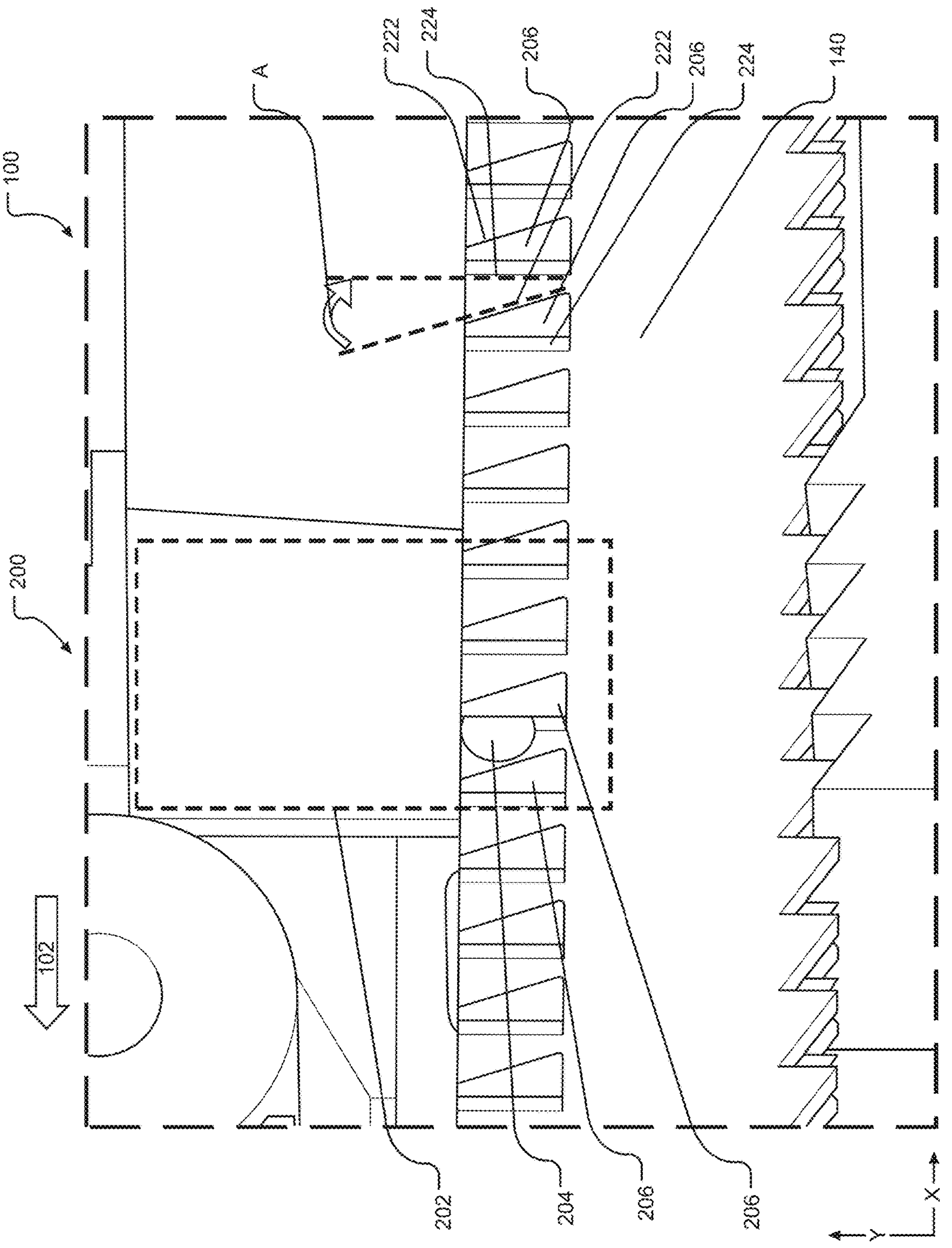
FIG. 15A illustrates a cross-sectional view of an aspect of a dispenser device according to aspects of the disclosure.

FIG. 15A illustrates a cross-sectional view of an aspect of a dispenser device according to aspects of the disclosure.

Figure 15B:
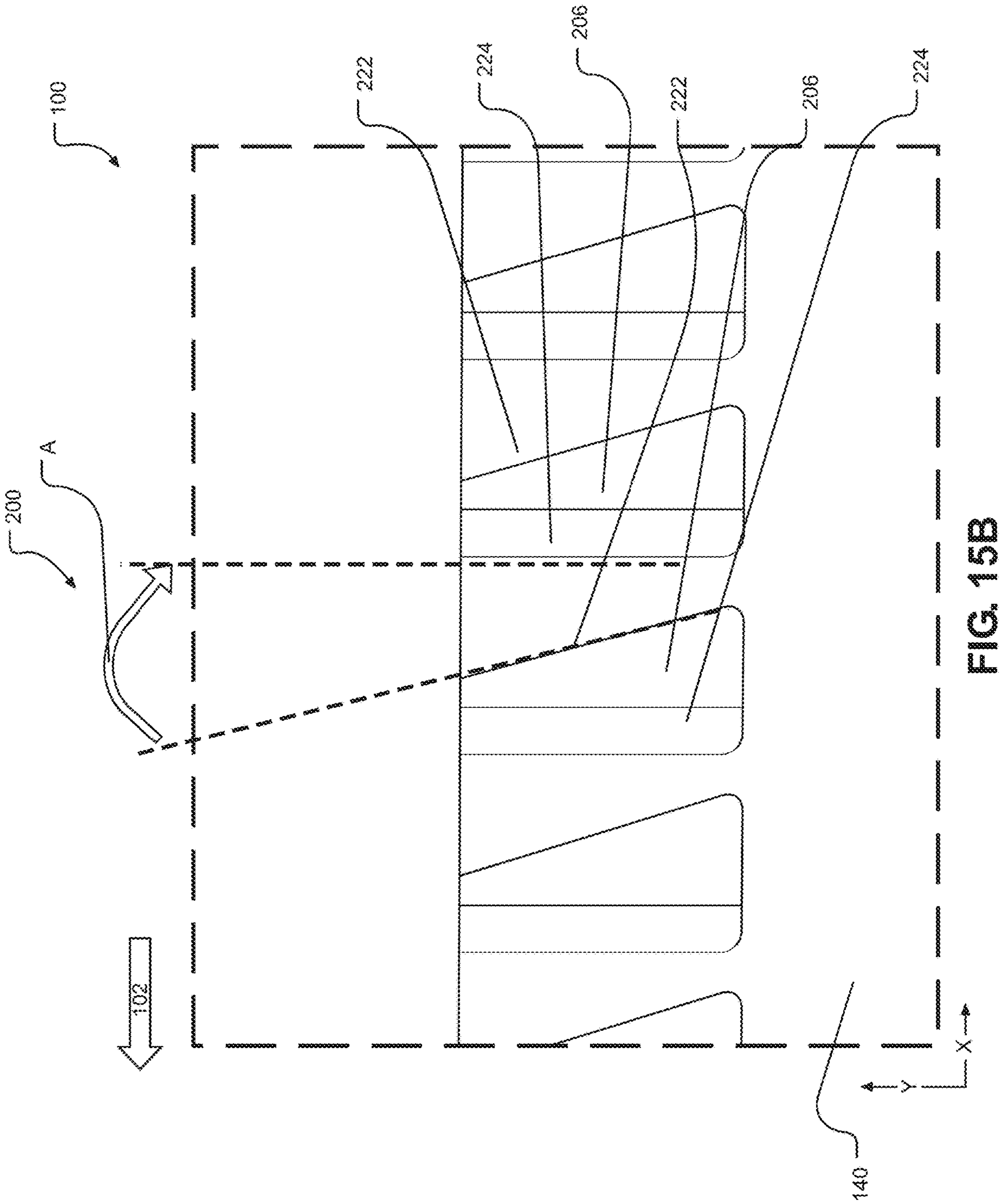
FIG. 15B illustrates a more detailed cross-sectional view of FIG. 15A.

FIG. 15B illustrates a more detailed cross-sectional view of FIG. 15A.

In particular, FIG. 15A and FIG. 15B illustrate the dispensing device 100 with a portion of the surface 166, the pawl extension 168, and one of the arms 202 hidden in order to more clearly illustrate operation. As illustrated in FIG. 15A and FIG. 15B, the locking rack 206 may be configured with a first surface 222 and a second surface 224. In particular, the first surface 222 and the second surface 224 of the locking rack 206 may be arranged non-symmetrically with an angle. In this regard, when there is back force on the plunger 140, which may be a force pushing to the right, opposite the direction 102, there will be a tendency for the locking teeth 204 to flex/cantilever down along the Y axis and potentially cause the locking teeth 204 to skip the locking rack 206 of the plunger 140. An angle “A” between the first surface 222 and the second surface 224 counteracts that effect. The angle A may be 1°-15°, but other angles are contemplated as well based on the configuration of the dispensing device 100. The locking teeth 204 that may be integral to the external pawl release button 116 can have a round profile as shown. However, other shapes of the locking teeth 204 may include geometry that may have a side that locks onto the first surface 222 of the locking rack 206 of the plunger 140 including, but not limited to, a parallel side that engages with the first surface 222.

As disclosed, the locking teeth 204 are implemented with the external pawl release button 116. In addition, the locking teeth 204 are added to the arms 202 or fin portion of the plunger 140. The stiffness of the release button structure that may include the arms 202 and associated support members keep the locking teeth 204 engaged with the locking rack 206 or fin teeth and prevents backward motion of the plunger 140. The locking teeth 204 or release button locking teeth and associated support members have sufficient flexibility to flex out of and into the page, in reference to the figures above, when the plunger 140 is driven forward. The plunger 140 can have a relief area for the driving pawl which corresponds to a plunger rack area without teeth, such that the driving pawl and the driving pawl release button locking teeth are in a position such that the locking teeth support members and the driving pawl spring member are not under stress in storage.

Figure 16:
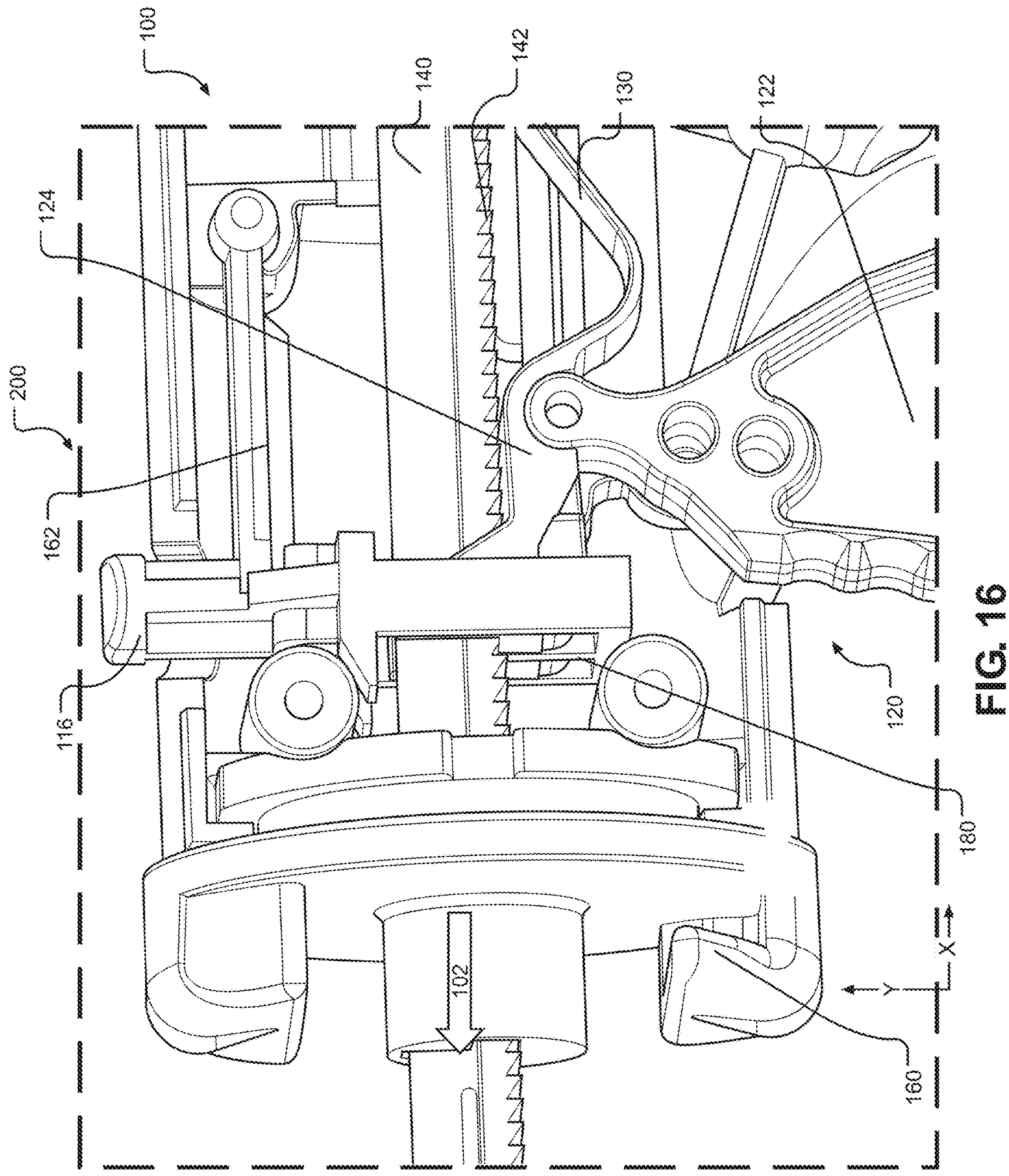
FIG. 16 illustrates a cross-sectional side view of the dispenser according to another aspect of FIG. 1.

FIG. 16 illustrates a cross-sectional side view of the dispenser according to another aspect of FIG. 1.

In particular, FIG. 16 may include any one or more of the features of the dispensing device 100 as described and illustrated herein. With reference to FIG. 16, FIG. 17, FIG. 18, FIG. 19, FIG. 20, FIG. 21, and FIG. 22, a portion of the locking mechanism 200 may be implemented as part of the external pawl release button 116, a portion of the locking mechanism 200 may be implemented as part of the plunger 140, and/or a portion of the locking mechanism 200 may be implemented as part of the pawl 124.

In the aspect illustrated in FIG. 16, the locking mechanism 200 may be implemented with one or more of the external pawl release button 116 and the pawl 124. In the aspect of FIG. 16, the locking mechanism 200, the external pawl release button 116, and/or the pawl 124 may be implemented with different configurations as further discussed below. In this regard, the locking mechanism 200 may implement the external pawl release button 116 with a locking pawl tooth support 180. The locking pawl tooth support 180 may extend up into the pawl 124.

Figure 17:
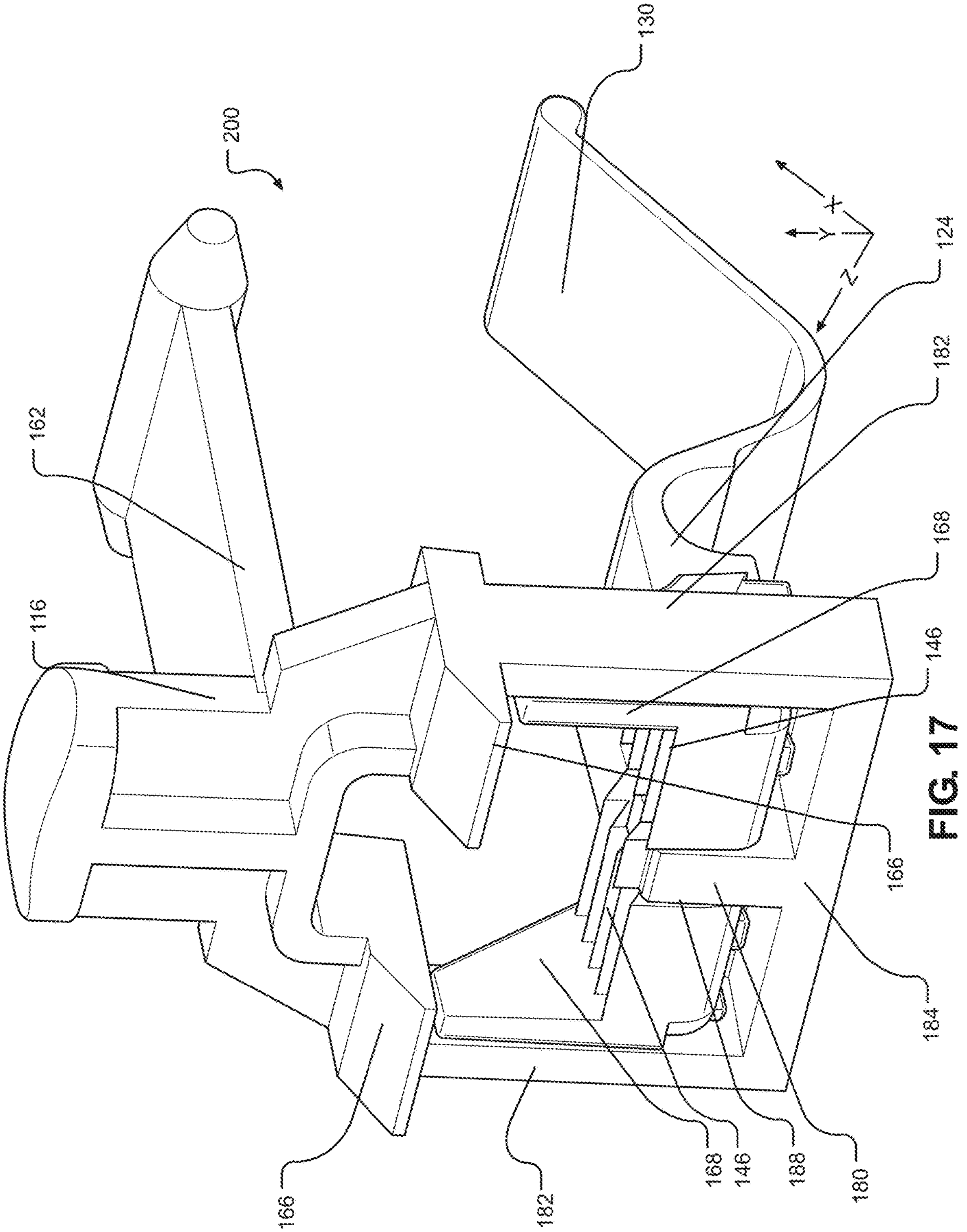
FIG. 17 illustrates a perspective view of the locking mechanism, the external pawl release button, and the pawl according to FIG. 16.

FIG. 17 illustrates a perspective view of the locking mechanism, the external pawl release button, and the pawl according to FIG. 16.

Figure 18:
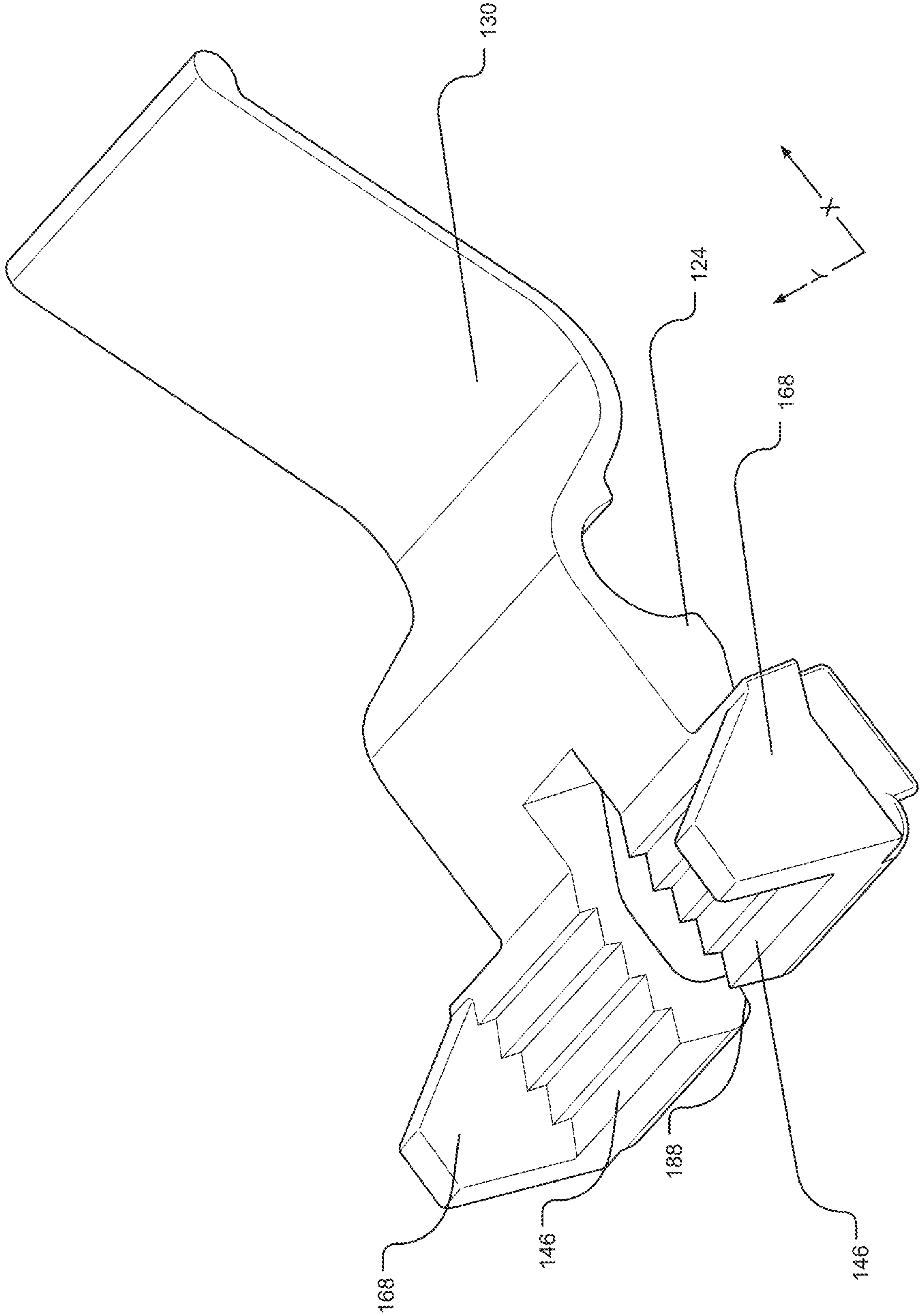
FIG. 18 illustrates a perspective view of the pawl according to FIG. 16.

FIG. 18 illustrates a perspective view of the pawl according to FIG. 16.

Figure 19:
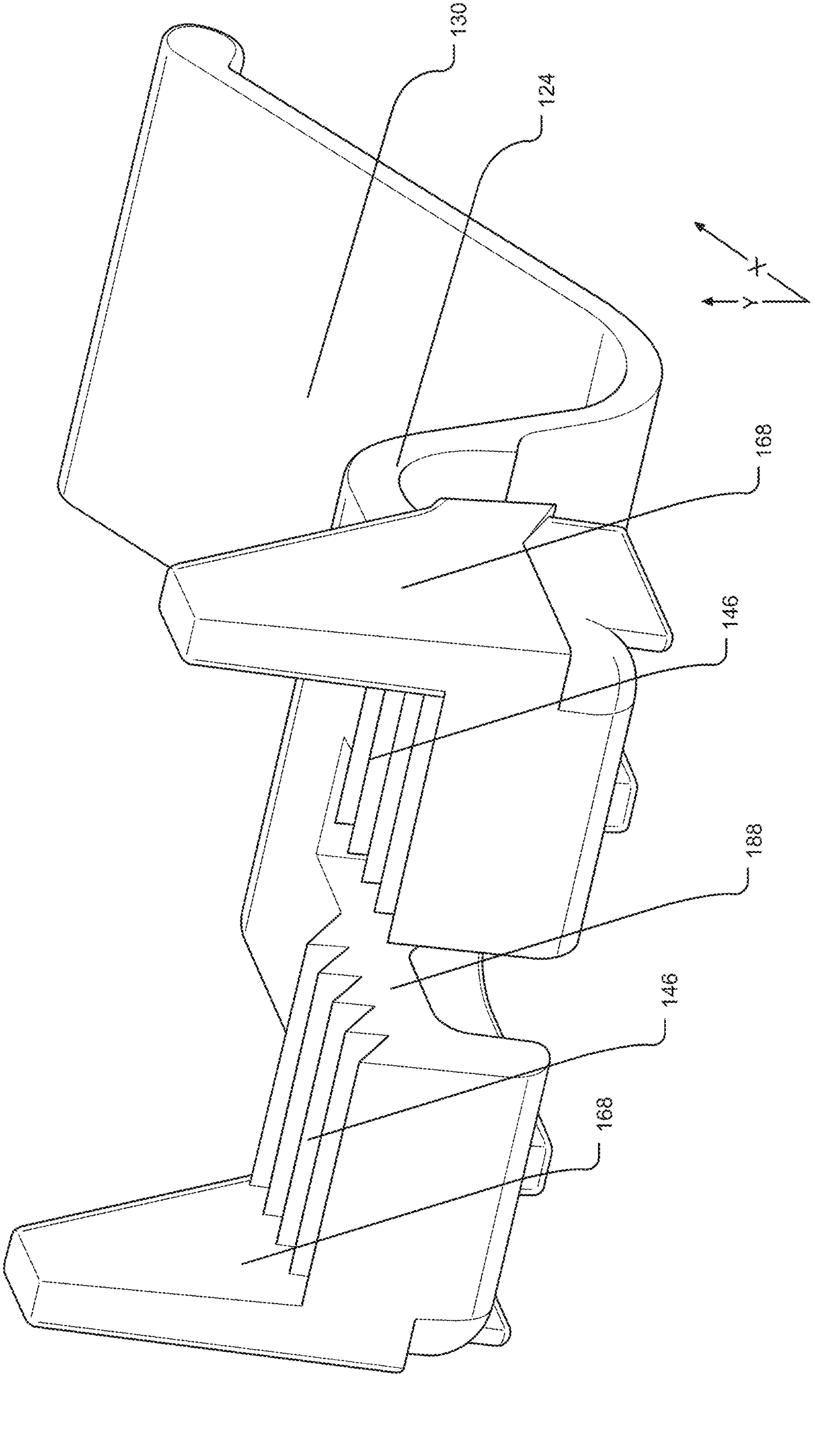
FIG. 19 illustrates another perspective view of the pawl according to FIG. 18.

FIG. 19 illustrates another perspective view of the pawl according to FIG. 18.

Figure 20:
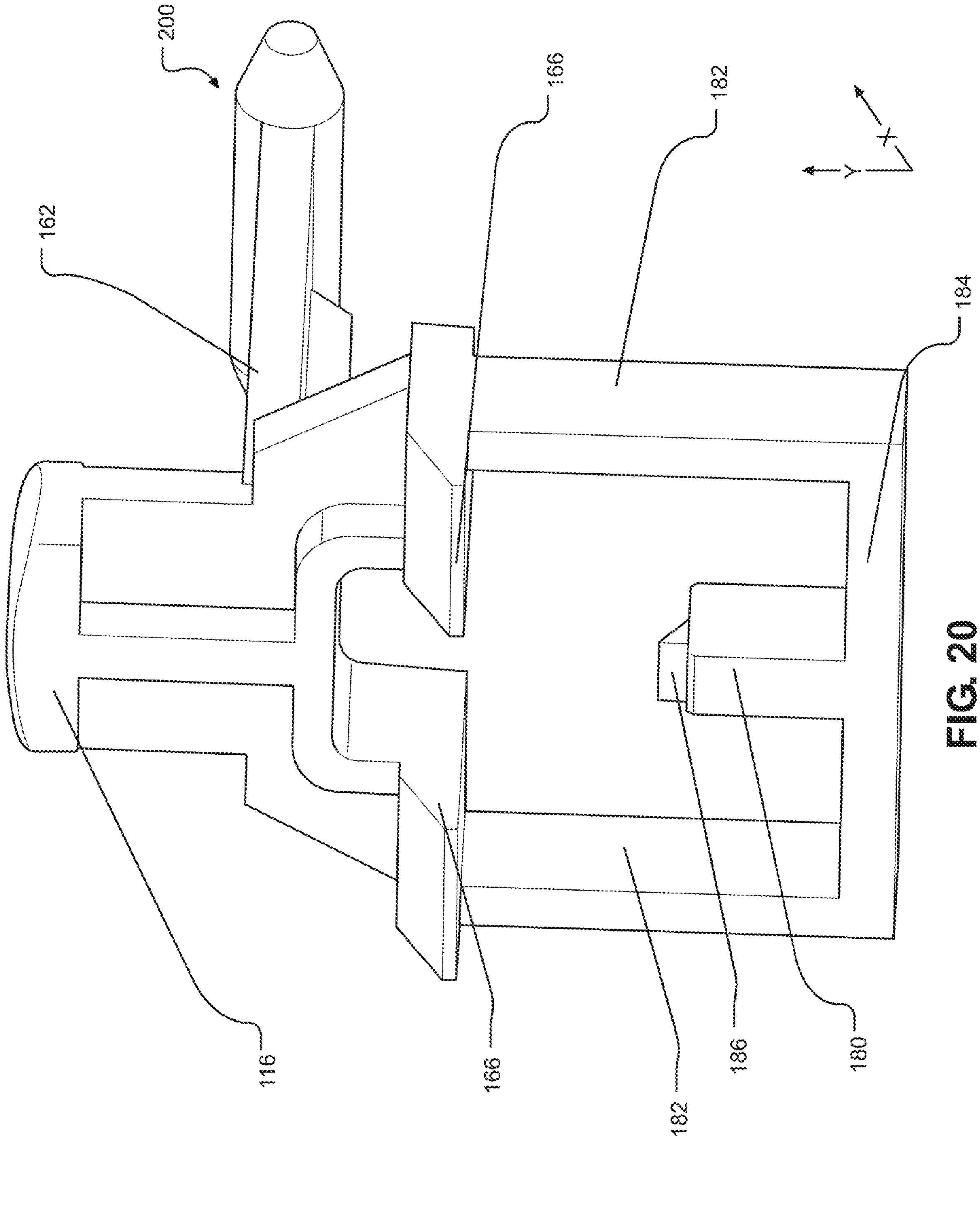
FIG. 20 illustrates a perspective view of the external pawl release button according to FIG. 16.

FIG. 20 illustrates a perspective view of the external pawl release button according to FIG. 16.

Figure 21:
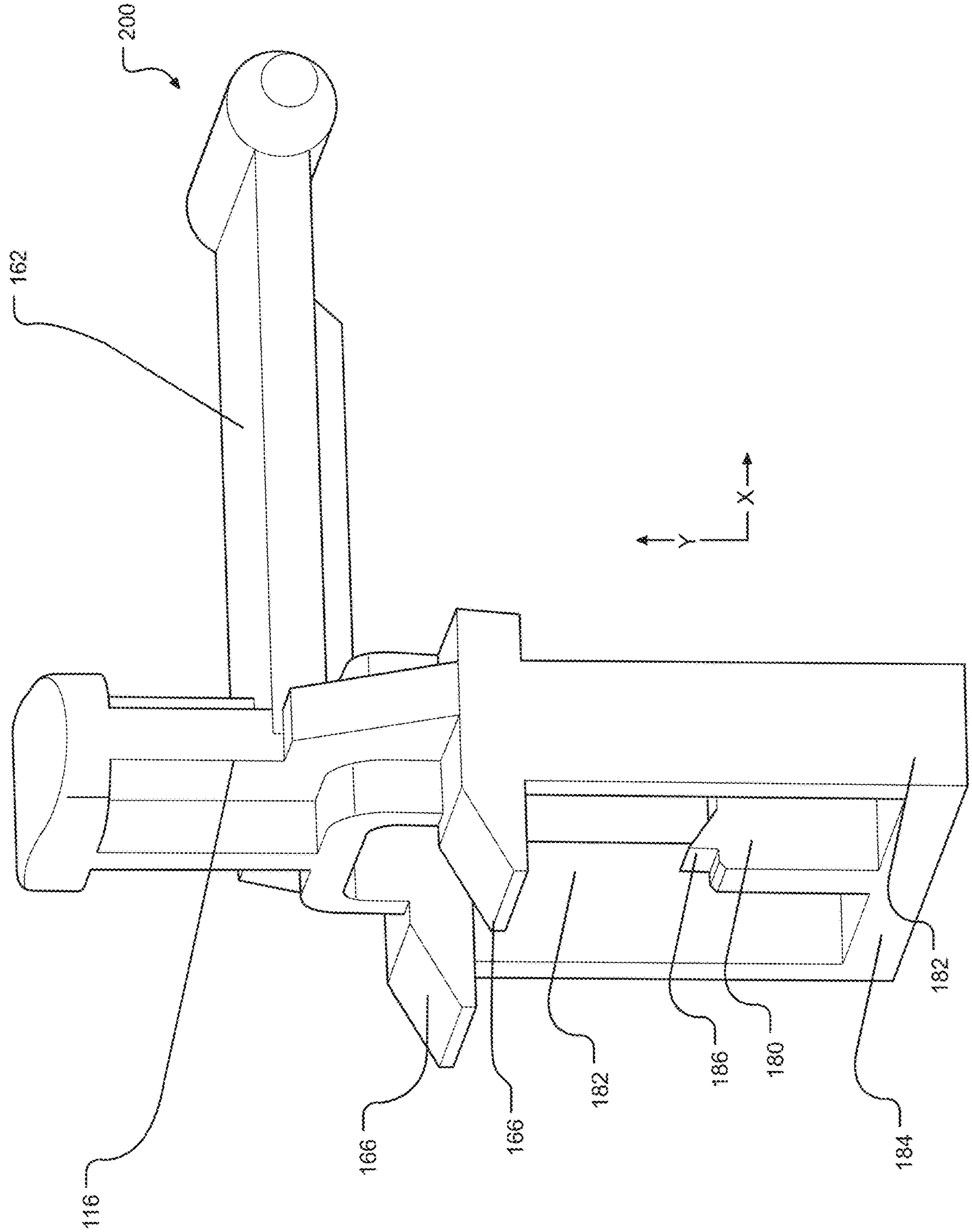
FIG. 21 illustrates another perspective view of the external pawl release button according to FIG. 20.

FIG. 21 illustrates another perspective view of the external pawl release button according to FIG. 20.

In particular, the external pawl release button 116 may include the button bias spring 162 and the surface 166 as previously described. Additionally, the external pawl release button 116 may include side portions 182 extending downwardly from the surface 166 along the y-axis. The side portions 182 may connect to a cross portion 184 that extends along the Z axis. Additionally, the locking pawl tooth support 180 may extend vertically along the y-axis up through the pawl 124. In particular, the pawl 124 may include a slot 188 to accommodate the locking pawl tooth support 180. The locking pawl tooth support 180 may include a locking pawl tooth 186 as illustrated in FIG. 20 and FIG. 21 arranged along an upper surface of the locking pawl tooth support 180. The locking pawl tooth 186 may be configured to engage with the rack 142 of the plunger 140.

FIG. 18 and FIG. 19 illustrate a portion of the locking mechanism 200 implemented by the pawl 124. The pawl 124 as illustrated in FIG. 18 includes the slot 188 arranged between the pawl teeth 146 of the pawl 124. As previously noted, the slot 188 may be configured to accommodate the locking pawl tooth support 180 and the locking pawl tooth 186 of the external pawl release button 116.

Figure 22:
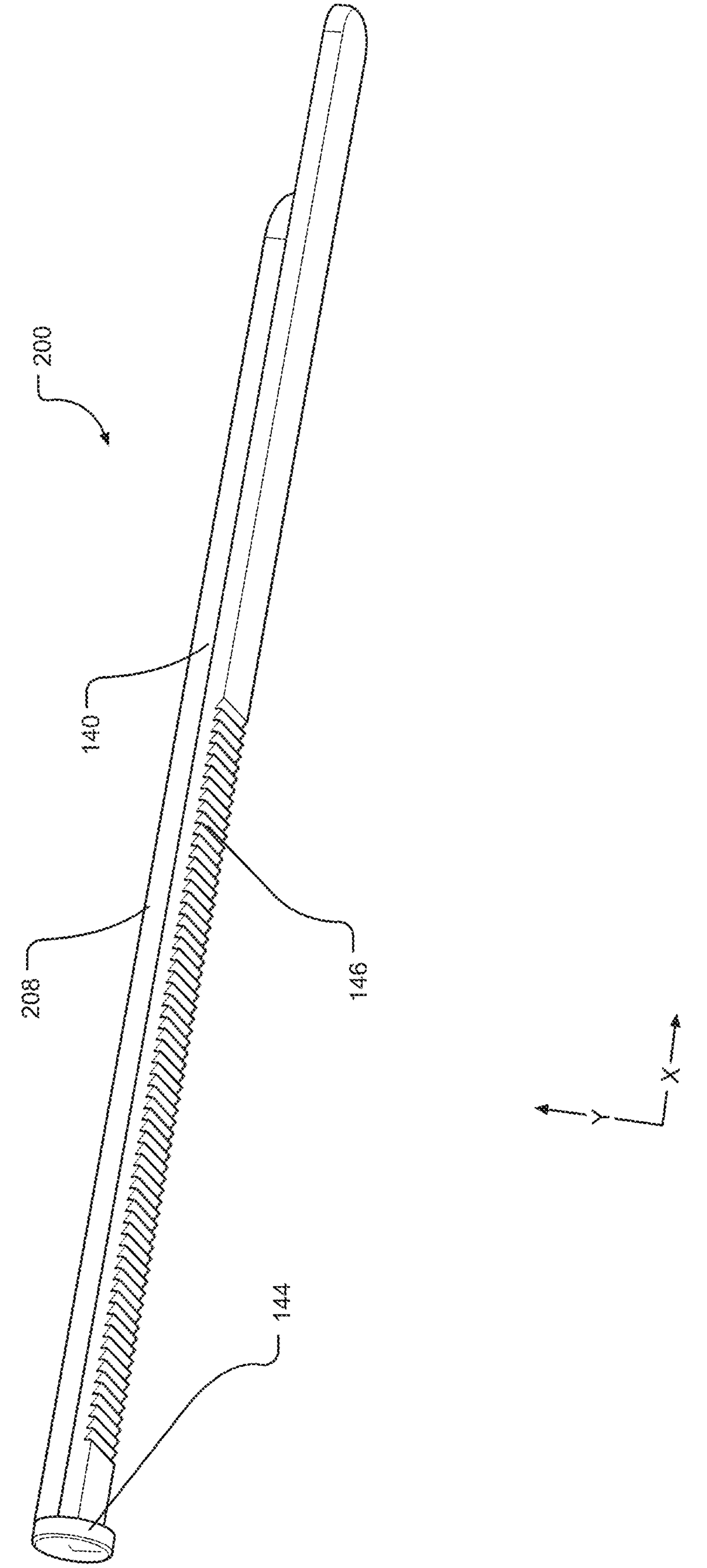
FIG. 22 illustrates a perspective view of a portion of an exemplary implementation of the locking mechanism according to an aspect of the disclosure.

FIG. 22 illustrates a perspective view of a portion of an exemplary implementation of the locking mechanism according to an aspect of the disclosure.

In particular, FIG. 22 illustrates the plunger 140 having the pawl teeth 146 arranged on a lower surface of the plunger 140 along the x-axis. Additionally, the plunger 140 may include the central rib 208 arranged vertically above the pawl teeth 146 along the y-axis.

Accordingly, in this aspect the locking mechanism 200 may be configured as one or more mechanical components including the external pawl release button 116, the pawl 124, and/or the plunger 140 and associated components to mechanically engage one or more of the components of the dispensing device 100 to mechanically lock and/or prevent the movement of the plunger 140 and/or the plunger head 144 in a direction opposite the direction 102 while in the locked configuration. Additionally, the external pawl release button 116 may be actuated by a user and the locking mechanism 200 may be placed in an unlocked configuration allowing the user to freely move the plunger 140. In particular, the external pawl release button 116 may be actuated by the user to move the locking pawl tooth support 180 and the locking pawl tooth 186 vertically downward along the y-axis to disengage the locking pawl tooth 186 from the pawl teeth 146.

Figure 23:
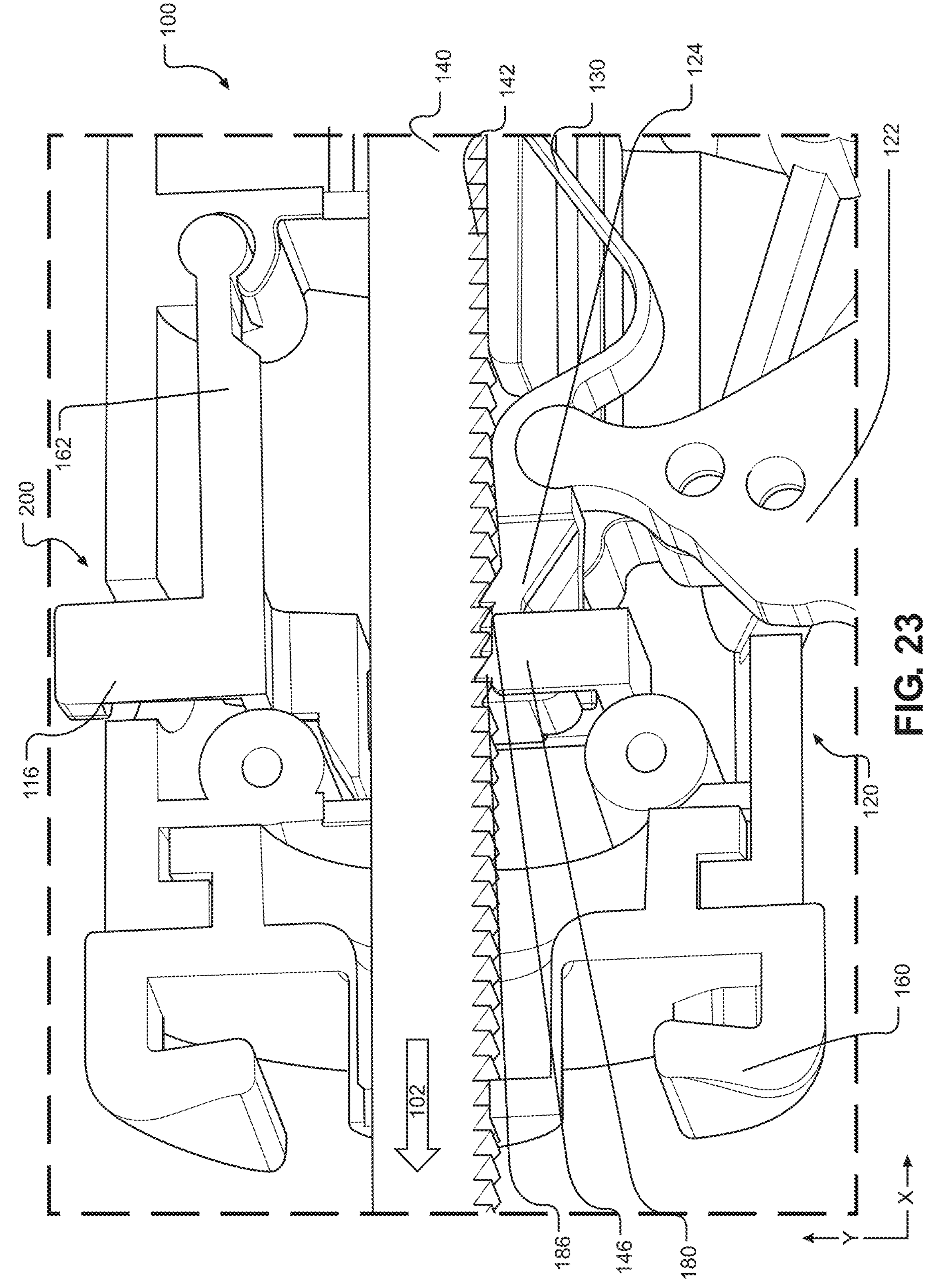
FIG. 23 illustrates a cross-sectional side view of the dispenser according to another aspect of FIG. 16.

FIG. 23 illustrates a cross-sectional side view of the dispenser according to another aspect of FIG. 16.

Figure 24:
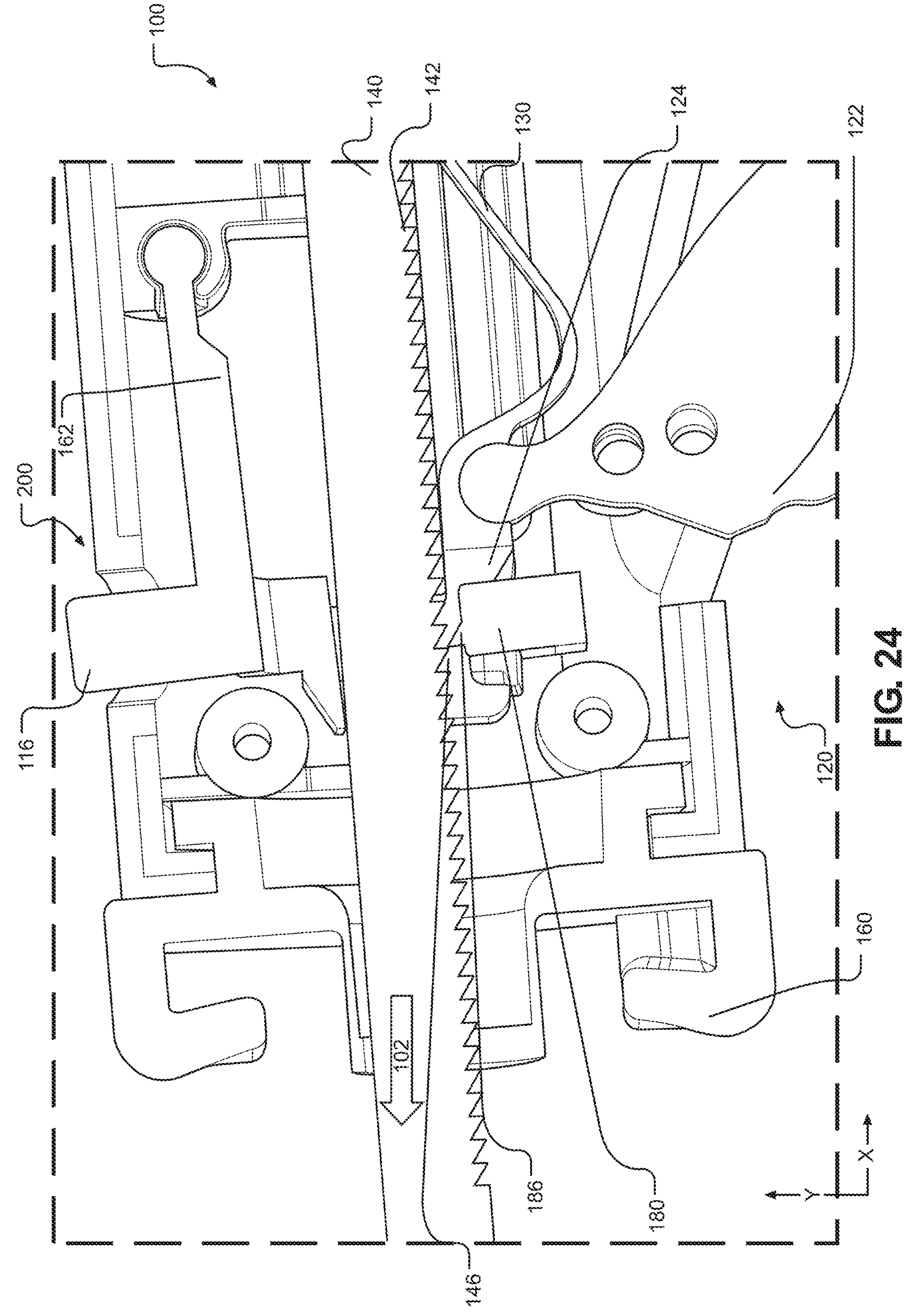
FIG. 24 illustrates a cross-sectional side view of the dispenser according to another aspect of FIG. 16.

FIG. 24 illustrates a cross-sectional side view of the dispenser according to another aspect of FIG. 16.

Figure 25:
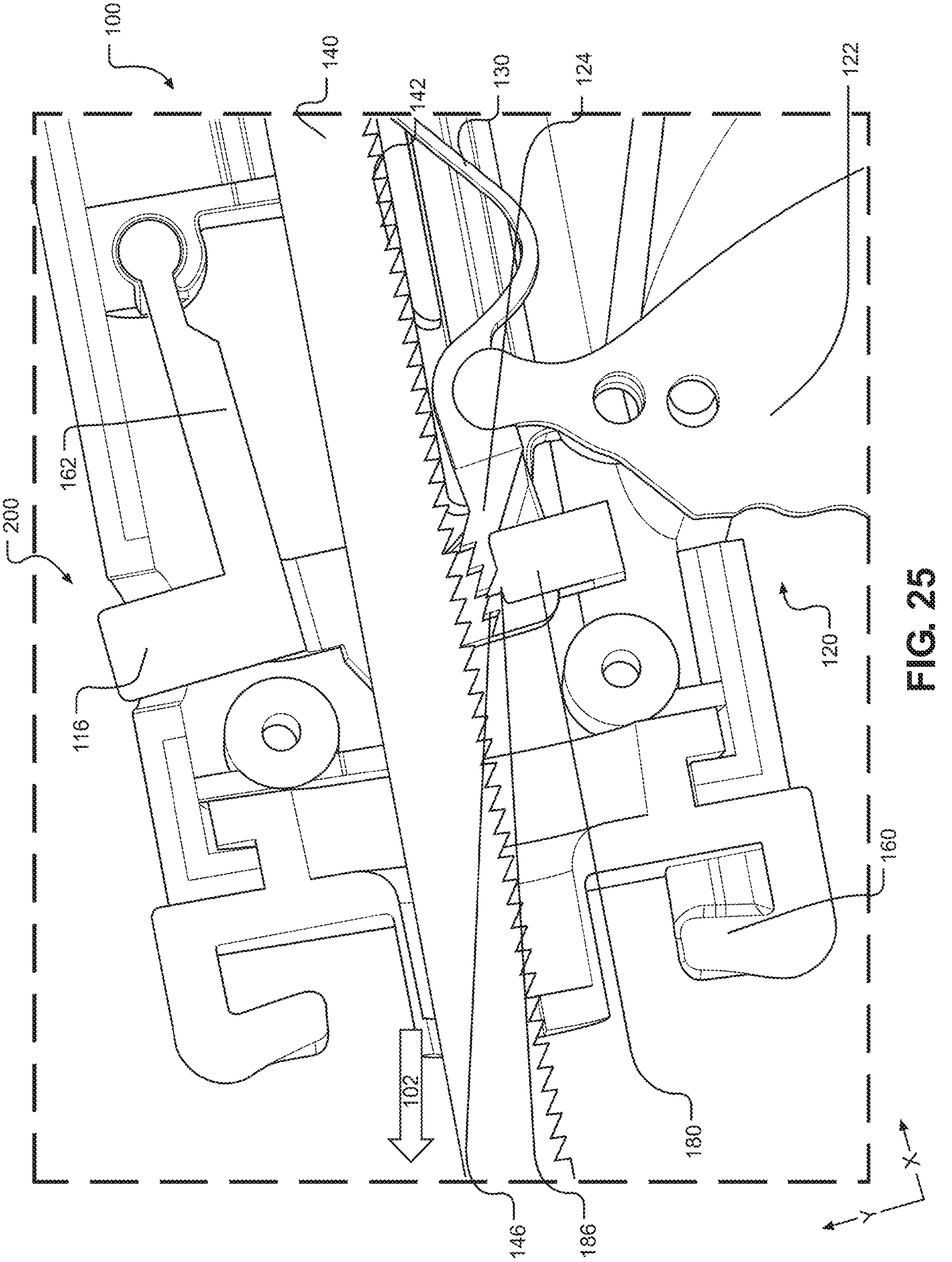
FIG. 25 illustrates a cross-sectional side view of the dispenser according to another aspect of FIG. 16.
Figure 26:
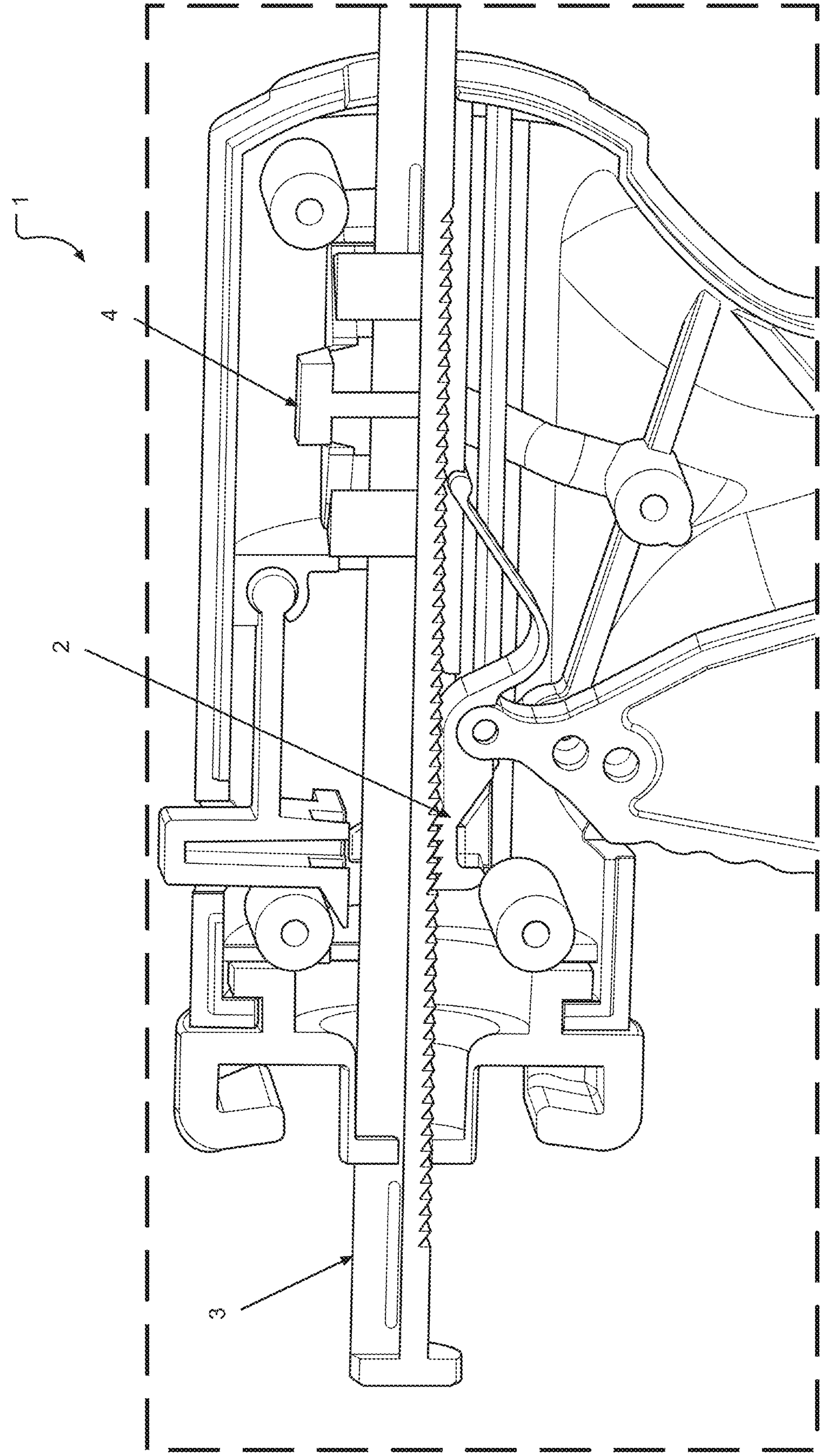
FIG. 26 Prior Art
FIG. 26 illustrates a cross-sectional side view of a dispenser according to the prior art.

FIG. 25 illustrates a cross-sectional side view of the dispenser according to another aspect of FIG. 16.

In particular, FIG. 23 illustrates the dispensing device 100 in a locked configuration with the pawl teeth 146 of the pawl 124 engaged with the rack 142 of the plunger 140. Additionally, the locking pawl tooth 186 arranged on the locking pawl tooth support 180 may also be engaged with the rack 142 of the plunger 140.

FIG. 24 illustrates the dispensing device 100 in a drive configuration with the pawl teeth 146 of the pawl 124 engaged with the rack 142 of the plunger 140 to drive the plunger 140 in the direction 102. Additionally, the locking pawl tooth 186 arranged on the locking pawl tooth support 180 may also be disengaged from the rack 142 of the plunger 140 by movement of the plunger 140 to allow the rack 142 to move in the direction 102.

Moreover, the dispensing device 100 in an unlocked configuration. In particular, the external pawl release button 116 has been moved by the user downwardly along the Y axis and accordingly the pawl teeth 146 of the pawl 124 may be disengaged from the rack 142 of the plunger 140 and the locking pawl tooth 186 arranged on the locking pawl tooth support 180 may also be disengaged from the rack 142 of the plunger 140 to allow the plunger 140 to move in a direction opposite the direction 102.

As disclosed, the locking pawl tooth 186 may be added to the external pawl release button 116 or driving pawl release button. The button bias spring 162 or spring extension keeps the teeth engaged with the rack 142 and prevents backward motion of the plunger 140 or ratchet plunger component.

The device of the disclosure can be provided with any number of the product cartridge holding mechanisms 160. The mechanism illustrated in the Figures is a bayonet holder. The cartridge, which would have ear flanges, would be pushed onto a centering hub and then twisted 90 degrees. The centering hub may have an O-ring or other resilient centering feature to allow for proper centering of the cartridge. The cartridge ears may twist into place behind the bayonet lugs, and may thus be securely locked into place on the dispensing device 100. Different diameter cartridges may require different bayonet holders.

Alternatively, adapters, drop-in designs could be used (an open tube with cup ends, for example), or a holding mechanism could be provided that holds cartridges or syringes having flanges, lugs or threads, externally or internally.

Although the disclosure has been illustrated as having integral plastic torsion bias and return springs, one of ordinary skill in the art will appreciate that other application specific spring types could be used without departing from the spirit and scope of the invention. For example, steam or heat sterilization (as required for some medical applications) may result in the plastic bias and return springs annealing. This could possibly destroy or reduce these plastic spring's effectiveness. To overcome this problem in applications requiring steam sterilization, metal torsion springs could be provided.

The following are a number of nonlimiting EXAMPLES of aspects of the disclosure. One EXAMPLE includes: EXAMPLE 1. A product dispensing device includes: a body having a first end and a second end; a product holding mechanism at the first end; a plunger defining a rack, supported by and extending through the product holding mechanism and the body from the first end to the second end; a drive mechanism, pivotally coupled to the body, including a trigger, a trigger return spring, and a pawl connected to the trigger via a pawl bias spring for bringing the pawl into contact with the plunger, the pawl having pawl teeth shaped to complement the rack; and a locking mechanism configured to limit a movement of the plunger in a rearwards direction while the locking mechanism is in a locked configuration, where when a user actuates the trigger, the pawl teeth are configured move the plunger forward toward the first end of the body.

The above-noted EXAMPLE may further include any one or a combination of more than one of the following EXAMPLES: 2. The product dispensing device of any EXAMPLE herein where the locking mechanism is configured to mechanically lock to a component of the product dispensing device. 3. The product dispensing device of any EXAMPLE herein where the locking mechanism is configured to mechanically lock to the rack. 4. The product dispensing device of any EXAMPLE herein where the locking mechanism configured to allow a movement of the plunger in a direction opposite the rearwards direction while the locking mechanism is in a locked configuration. 5. The product dispensing device of any EXAMPLE herein where the locking mechanism configured to allow a movement of the plunger in the rearwards direction while the locking mechanism is in an unlocked configuration. 6. The product dispensing device of any EXAMPLE herein where the locking mechanism configured to be placed in an unlocked configuration in response to operation of a pawl release button. 7. The product dispensing device of any EXAMPLE herein where the locking mechanism is implemented as part of a pawl release button. 8. The product dispensing device of any EXAMPLE herein where the pawl release button includes arms and the pawl release button includes locking teeth arranged on the arms. 9. The product dispensing device of any EXAMPLE herein where the locking teeth are configured to engage with a locking rack arranged on the plunger. 10. The product dispensing device of any EXAMPLE herein where the locking rack are configured with a first surface and a second surface and there is an angle between the first surface and the second surface. 11. The product dispensing device of any EXAMPLE herein where: the locking mechanism is implemented as part of a pawl release button; the pawl release button includes arms and locking teeth arranged on the arms; and the locking teeth are configured to engage with a locking rack arranged on the plunger. 12. The product dispensing device of any EXAMPLE herein 1 where the locking rack are configured with a first surface and a second surface and there is an angle between the first surface and the second surface. 13. The product dispensing device of any EXAMPLE herein where the locking mechanism is implemented as part of an external pawl release button. 14. The product dispensing device of any EXAMPLE herein 3 where the external pawl release button includes a locking pawl tooth support that extends into the pawl. 15. The product dispensing device of any EXAMPLE herein 4 where the pawl includes a slot to accommodate the locking pawl tooth support. 16. The product dispensing device of any EXAMPLE herein 5 where the locking pawl tooth support includes a locking pawl tooth configured to engage with the rack of the plunger. 17. The product dispensing device of any EXAMPLE herein where: the locking mechanism includes an external pawl release button; the external pawl release button includes a locking pawl tooth support; and the locking pawl tooth support includes a locking pawl tooth configured to engage with the rack of the plunger. 18. The product dispensing device of any EXAMPLE herein where: the locking mechanism includes an external pawl release button; the external pawl release button includes a locking pawl tooth support that extends into the pawl; the pawl includes a slot to accommodate the locking pawl tooth support; and the locking pawl tooth support includes a locking pawl tooth configured to engage with the rack of the plunger. 19. The product dispensing device of any EXAMPLE herein where the product dispensing device further includes a pawl release feature connected to at least one of the body and the pawl for allowing a user to place the locking mechanism in an unlocked configuration. 20. The product dispensing device of any EXAMPLE herein includes a floating gripper, where the body further includes a pocket defined by a forward pocket wall and a rear pocket wall, the floating gripper being disposed within the pocket and is slidably frictionally coupled to the plunger, a friction force of the floating gripper being greater than a rearwards force on the plunger caused by rearwardly sliding pawl teeth; and where when the user actuates the trigger to advance the plunger the floating gripper contacts the forward pocket wall and the plunger slides through the floating gripper, and when the trigger is released, the plunger, acting upon a force of the pawl teeth sliding, moves rearwards until the floating gripper contacts the rear pocket wall. 21. The product dispensing device of any EXAMPLE herein where the product dispensing device further includes a pawl release feature connected to at least one of the body and the pawl for allowing a user to disengage the pawl from the plunger. 22. The product dispensing device of any EXAMPLE herein where when the drive mechanism is unactuated the pawl teeth do not engage the rack.

One EXAMPLE includes: EXAMPLE 23. A product dispensing device includes: a body having a first end and a second end; a product holding mechanism at the first end; a plunger defining a rack, supported by and extending through the product holding mechanism and the body from the first end to the second end; a drive mechanism, pivotally coupled to the body, including a trigger, a trigger return spring, and a pawl connected to the trigger via a pawl bias spring for bringing the pawl into contact with the plunger, the pawl having pawl teeth shaped to complement the rack; and a locking mechanism configured to limit a movement of the plunger in a rearwards direction while the locking mechanism is in a locked configuration, where when a user actuates the trigger, the pawl teeth are configured move the plunger forward toward the first end of the body, and when the user releases the trigger, the pawl teeth are configured to slide back over the rack allowing the user to further advance the plunger upon subsequent actuation of the trigger.

The above-noted EXAMPLE may further include any one or a combination of more than one of the following EXAMPLES: 24. The product dispensing device of any EXAMPLE herein where the locking mechanism is configured to mechanically lock to a component of the product dispensing device. 25. The product dispensing device of any EXAMPLE herein where the locking mechanism is configured to mechanically lock to the rack. 26. The product dispensing device of any EXAMPLE herein where the locking mechanism configured to allow a movement of the plunger in a direction opposite the rearwards direction while the locking mechanism is in a locked configuration. 27. The product dispensing device of any EXAMPLE herein where the locking mechanism configured to allow a movement of the plunger in the rearwards direction while the locking mechanism is in an unlocked configuration. 28. The product dispensing device of any EXAMPLE herein where the locking mechanism configured to be placed in an unlocked configuration in response to operation of a pawl release button. 29. The product dispensing device of any EXAMPLE herein where the locking mechanism is implemented as part of a pawl release button. 30. The product dispensing device of any EXAMPLE herein where the pawl release button includes arms and the pawl release button includes locking teeth arranged on the arms. 31. The product dispensing device of any EXAMPLE herein where the locking teeth are configured to engage with a locking rack arranged on the plunger. 32. The product dispensing device of any EXAMPLE herein where the locking rack are configured with a first surface and a second surface and there is an angle between the first surface and the second surface. 33. The product dispensing device of any EXAMPLE herein where: the locking mechanism is implemented as part of a pawl release button; the pawl release button includes arms and locking teeth arranged on the arms; and the locking teeth are configured to engage with a locking rack arranged on the plunger. 34. The product dispensing device of any EXAMPLE herein where the locking rack are configured with a first surface and a second surface and there is an angle between the first surface and the second surface. 35. The product dispensing device of any EXAMPLE herein where the locking mechanism is implemented as part of an external pawl release button. 36. The product dispensing device of any EXAMPLE herein where the external pawl release button includes a locking pawl tooth support that extends into the pawl. 37. The product dispensing device of any EXAMPLE herein where the pawl includes a slot to accommodate the locking pawl tooth support. 38. The product dispensing device of any EXAMPLE herein where the locking pawl tooth support includes a locking pawl tooth configured to engage with the rack of the plunger. 39. The product dispensing device of any EXAMPLE herein where: the locking mechanism includes an external pawl release button; the external pawl release button includes a locking pawl tooth support; and the locking pawl tooth support includes a locking pawl tooth configured to engage with the rack of the plunger. 40. The product dispensing device of any EXAMPLE herein where: the locking mechanism includes an external pawl release button; the external pawl release button includes a locking pawl tooth support that extends into the pawl; the pawl includes a slot to accommodate the locking pawl tooth support; and the locking pawl tooth support includes a locking pawl tooth configured to engage with the rack of the plunger. 41. The product dispensing device of any EXAMPLE herein where the product dispensing device further includes a pawl release feature connected to at least one of the body and the pawl for allowing a user to place the locking mechanism in an unlocked configuration. 42. The product dispensing device of any EXAMPLE herein includes a floating gripper, where the body further includes a pocket defined by a forward pocket wall and a rear pocket wall, the floating gripper being disposed within the pocket and is slidably frictionally coupled to the plunger, a friction force of the floating gripper being greater than a rearwards force on the plunger caused by rearwardly sliding pawl teeth; and where when the user actuates the trigger to advance the plunger the floating gripper contacts the forward pocket wall and the plunger slides through the floating gripper, and when the trigger is released, the plunger, acting upon a force of the pawl teeth sliding, moves rearwards until the floating gripper contacts the rear pocket wall. 43. The product dispensing device of any EXAMPLE herein where the product dispensing device further includes a pawl release feature connected to at least one of the body and the pawl for allowing a user to disengage the pawl from the plunger. 44. The product dispensing device of any EXAMPLE herein where when the drive mechanism is unactuated the pawl teeth do not engage the rack.

One EXAMPLE includes: EXAMPLE 45. A product dispensing device includes: a body having a first end and a second end; a product holding mechanism at the first end; a plunger defining a rack, supported by and extending through the product holding mechanism and the body from the first end to the second end; a drive mechanism, pivotally coupled to the body, including a trigger, a trigger return spring, and a pawl connected to the trigger via a pawl bias spring for bringing the pawl into contact with the plunger, the pawl having pawl teeth shaped to complement the rack; and a locking mechanism configured to limit a movement of the plunger in a rearwards direction while the locking mechanism is in a locked configuration, where when a user actuates the trigger, the pawl teeth are configured move the plunger forward toward the first end of the body; and where the locking mechanism is configured to mechanically lock to a component of the product dispensing device.

The above-noted EXAMPLE may further include any one or a combination of more than one of the following EXAMPLES: 46. The product dispensing device of any EXAMPLE herein where the locking mechanism is configured to mechanically lock to the rack. 47. The product dispensing device of any EXAMPLE herein where the locking mechanism configured to allow a movement of the plunger in a direction opposite the rearwards direction while the locking mechanism is in a locked configuration. 48. The product dispensing device of any EXAMPLE herein where the locking mechanism configured to allow a movement of the plunger in the rearwards direction while the locking mechanism is in an unlocked configuration. 49. The product dispensing device of any EXAMPLE herein where the locking mechanism configured to be placed in an unlocked configuration in response to operation of a pawl release button. 50. The product dispensing device of any EXAMPLE herein where the locking mechanism is implemented as part of a pawl release button. 51. The product dispensing device of any EXAMPLE herein where the pawl release button includes arms and the pawl release button includes locking teeth arranged on the arms. 52. The product dispensing device of any EXAMPLE herein where the locking teeth are configured to engage with a locking rack arranged on the plunger. 53. The product dispensing device of any EXAMPLE herein where the locking rack are configured with a first surface and a second surface and there is an angle between the first surface and the second surface. 54. The product dispensing device of any EXAMPLE herein where: the locking mechanism is implemented as part of a pawl release button; the pawl release button includes arms and locking teeth arranged on the arms; and the locking teeth are configured to engage with a locking rack arranged on the plunger. 55. The product dispensing device of any EXAMPLE herein where the locking rack are configured with a first surface and a second surface and there is an angle between the first surface and the second surface. 56. The product dispensing device of any EXAMPLE herein where the locking mechanism is implemented as part of an external pawl release button. 57. The product dispensing device of any EXAMPLE herein where the external pawl release button includes a locking pawl tooth support that extends into the pawl. 58. The product dispensing device of any EXAMPLE herein where the pawl includes a slot to accommodate the locking pawl tooth support. 59. The product dispensing device of any EXAMPLE herein where the locking pawl tooth support includes a locking pawl tooth configured to engage with the rack of the plunger. 60. The product dispensing device of any EXAMPLE herein where: the locking mechanism includes an external pawl release button; the external pawl release button includes a locking pawl tooth support; and the locking pawl tooth support includes a locking pawl tooth configured to engage with the rack of the plunger. 61. The product dispensing device of any EXAMPLE herein where: the locking mechanism includes an external pawl release button; the external pawl release button includes a locking pawl tooth support that extends into the pawl; the pawl includes a slot to accommodate the locking pawl tooth support; and the locking pawl tooth support includes a locking pawl tooth configured to engage with the rack of the plunger. 62. The product dispensing device of any EXAMPLE herein where the product dispensing device further includes a pawl release feature connected to at least one of the body and the pawl for allowing a user to place the locking mechanism in an unlocked configuration. 63. The product dispensing device of any EXAMPLE herein includes a floating gripper, where the body further includes a pocket defined by a forward pocket wall and a rear pocket wall, the floating gripper being disposed within the pocket and is slidably frictionally coupled to the plunger, a friction force of the floating gripper being greater than a rearwards force on the plunger caused by rearwardly sliding pawl teeth; and where when the user actuates the trigger to advance the plunger the floating gripper contacts the forward pocket wall and the plunger slides through the floating gripper, and when the trigger is released, the plunger, acting upon a force of the pawl teeth sliding, moves rearwards until the floating gripper contacts the rear pocket wall. 64. The product dispensing device of any EXAMPLE herein where the product dispensing device further includes a pawl release feature connected to at least one of the body and the pawl for allowing a user to disengage the pawl from the plunger. 65. The product dispensing device of any EXAMPLE herein where when the drive mechanism is unactuated the pawl teeth do not engage the rack.

Since certain changes may be made in the above described dispensing device, without departing from the spirit and scope of the invention herein involved, it is intended that all of the subject matter of the above description or shown in the accompanying drawings shall be interpreted merely as examples illustrating the inventive concept herein and shall not be construed as limiting the invention. For example, the dispenser of the disclosure could readily be adapted to a two plunger head design for dispensing two-part products such as epoxy from parallel tube two-part packages.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto another element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over another element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

Relative terms such as “below” or “above” or “upper” or “lower” or “horizontal” or “vertical” may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular aspects only and is not intended to be limiting of the disclosure. As used herein, the singular forms “a,” “an,” and “the” are intended to include the plural forms as well, unless the context clearly indicates otherwise. It will be further understood that the terms “comprises,” “comprising,” “includes,” and/or “including” when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A product dispensing device comprising:

a body having a first end and a second end;

a product holding mechanism at the first end;

a plunger defining a rack, supported by and extending through the product holding mechanism and the body from the first end to the second end;

a drive mechanism, pivotally coupled to the body, including a trigger, a trigger return spring, and a pawl connected to the trigger via a pawl bias spring for bringing the pawl into contact with the plunger, the pawl having pawl teeth shaped to complement the rack; and a locking mechanism configured to limit a movement of the plunger in a rearwards direction while the locking mechanism is in a locked configuration, wherein when a user actuates the trigger, the pawl teeth are configured to move the plunger forward toward the first end of the body.

2. The product dispensing device of claim 1 wherein the locking mechanism is configured to mechanically lock to a component of the product dispensing device.

3. The product dispensing device of claim 1 wherein the locking mechanism is configured to mechanically lock to the rack.

4. The product dispensing device of claim 1 wherein the locking mechanism is configured to allow a movement of the plunger in a direction opposite the rearwards direction while the locking mechanism is in a locked configuration.

5. The product dispensing device of claim 1 wherein the locking mechanism is configured to allow a movement of the plunger in the rearwards direction while the locking mechanism is in an unlocked configuration.

6. The product dispensing device of claim 1 wherein the locking mechanism is configured to be placed in an unlocked configuration in response to operation of a pawl release button.

7. The product dispensing device of claim 1 wherein the locking mechanism is implemented as part of a pawl release button.

8. The product dispensing device of claim 7 wherein the pawl release button comprises arms and the pawl release button comprises locking teeth arranged on the arms.

9. The product dispensing device of claim 8 wherein the locking teeth are configured to engage with a locking rack arranged on the plunger.

10. The product dispensing device of claim 9 wherein the locking rack are configured with a first surface and a second surface and there is an angle between the first surface and the second surface.

11. The product dispensing device of claim 1 wherein:

the locking mechanism is implemented as part of a pawl release button;

the pawl release button comprises arms and locking teeth arranged on the arms; and the locking teeth are configured to engage with a locking rack arranged on the plunger.

12. The product dispensing device of claim 11 wherein the locking rack are configured with a first surface and a second surface and there is an angle between the first surface and the second surface.

13. The product dispensing device of claim 1 wherein the locking mechanism is implemented as part of an external pawl release button.

14. The product dispensing device of claim 13 wherein the external pawl release button comprises a locking pawl tooth support that extends into the pawl.

15. The product dispensing device of claim 14 wherein the pawl comprises a slot to accommodate the locking pawl tooth support.

16. The product dispensing device of claim 15 wherein the locking pawl tooth support includes a locking pawl tooth configured to engage with the rack of the plunger.

17. The product dispensing device of claim 1 wherein the product dispensing device further comprises a pawl release feature connected to at least one of the body and the pawl for allowing a user to place the locking mechanism in an unlocked configuration.

18. The product dispensing device of claim 1 wherein the product dispensing device further comprises a pawl release feature connected to at least one of the body and the pawl for allowing a user to disengage the pawl from the plunger.

19. The product dispensing device of claim 1 wherein when the drive mechanism is unactuated the pawl teeth do not engage the rack.

20. A product dispensing device comprising:

a body having a first end and a second end;

a product holding mechanism at the first end;

a plunger defining a rack, supported by and extending through the product holding mechanism and the body from the first end to the second end;

a drive mechanism, pivotally coupled to the body, including a trigger, a trigger return spring, and a pawl connected to the trigger via a pawl bias spring for bringing the pawl into contact with the plunger, the pawl having pawl teeth shaped to complement the rack; and a locking mechanism configured to limit a movement of the plunger in a rearwards direction while the locking mechanism is in a locked configuration, wherein when a user actuates the trigger, the pawl teeth are configured move the plunger forward toward the first end of the body, and when the user releases the trigger, the pawl teeth are configured to slide back over the rack allowing the user to further advance the plunger upon subsequent actuation of the trigger.

* * * * *